(12) United States Patent
Ito et al.

(10) Patent No.: US 7,050,498 B2
(45) Date of Patent: May 23, 2006

(54) IMAGE GENERATING METHOD, APPARATUS AND SYSTEM USING CRITICAL POINTS

(75) Inventors: Hirofumi Ito, Tokyo (JP); Kozo Akiyoshi, Tokyo (JP); Nobuo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 437 days.

(21) Appl. No.: 10/056,025

(22) Filed: Jan. 28, 2002

(65) Prior Publication Data
US 2002/0196372 A1 Dec. 26, 2002

(30) Foreign Application Priority Data
Feb. 6, 2001 (JP) .............................. 2001-029061

(51) Int. Cl.
*H04N 7/12* (2006.01)
*H44B 1/66* (2006.01)

(52) U.S. Cl. ................................. 375/240.12

(58) Field of Classification Search ........... 375/240.12; 382/107; 345/582, 634, 475; 348/157; H04B 1/66; H04N 7/12
See application file for complete search history.

(56) References Cited

U.S. PATENT DOCUMENTS

| | | | | |
|---|---|---|---|---|
| 5,434,590 A | * | 7/1995 | Dinwiddie et al. | ......... 345/634 |
| 6,018,592 A | | 1/2000 | Shinagawa et al. | |
| 6,137,910 A | | 10/2000 | Shinagawa et al. | |
| 6,151,033 A | * | 11/2000 | Mihara et al. | ............... 345/475 |
| 6,208,350 B1 | * | 3/2001 | Herrera | ....................... 345/582 |
| 6,396,503 B1 | * | 5/2002 | Goss et al. | .................. 345/582 |
| 6,462,754 B1 | * | 10/2002 | Chakraborty et al. | ........ 715/723 |
| 6,487,304 B1 | * | 11/2002 | Szeliski | ...................... 382/107 |

FOREIGN PATENT DOCUMENTS

| | | |
|---|---|---|
| JP | 6-149694 | 5/1994 |
| JP | 8-289297 A | 11/1996 |
| JP | 2927350 B | 5/1999 |
| WO | WO 99/65224 | 12/1999 |

OTHER PUBLICATIONS

Japan Patent Office, Notification of Reason(s) for Refusal, Mar. 8, 2005, pp. 1-8.
Patent Abstracts of Japan, Patent No. JP 2927350 B, May 14, 1999, Monolith Co., Ltd.
Patent Abstracts of Japan, Patent No. JP 8-289297 A, Nov. 1, 1996, Hitachi Ltd.
English Abstract of JP Patent Application No. 2001-028061.
Decision Refusal, Aug. 23, 2005, Patent Abstract of Japan, Japanese Patent Office, 2 pages.

* cited by examiner

*Primary Examiner*—Tung Vo

(57) ABSTRACT

In an image generating system or apparatus, a first storage unit stores key frames and corresponding point data therefor. A performance specifying unit determines a processing performance of a user terminal. A resolution decision unit determines a resolution of motion pictures (intermediate frames) to be generated or reproduced in accordance with the determined processing performance. An intermediate frame generator generates intermediate frames at the determined resolution by interpolating the key frames based on the corresponding point data.

12 Claims, 17 Drawing Sheets

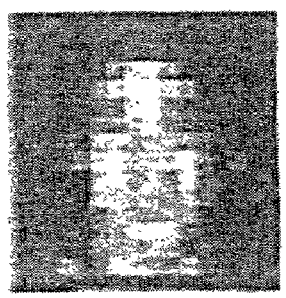 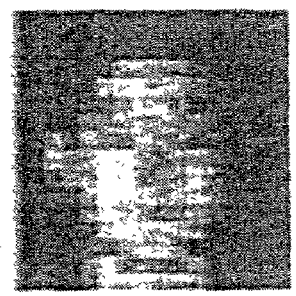
Fig. 1a    Fig. 1b
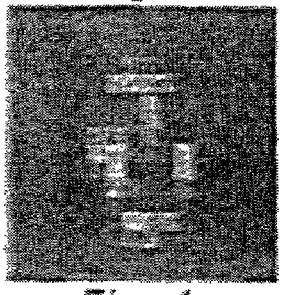 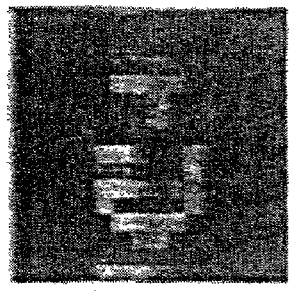
Fig. 1c    Fig. 1d
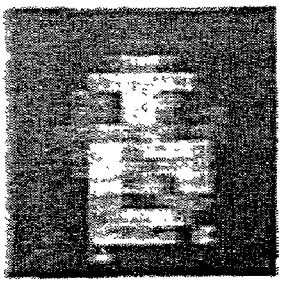 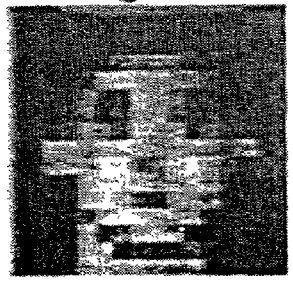
Fig. 1e    Fig. 1f
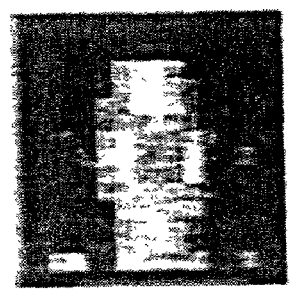 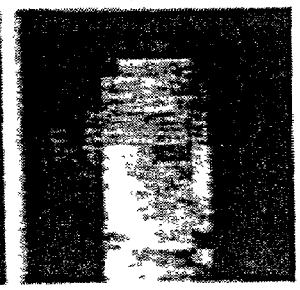
Fig. 1g    Fig. 1h
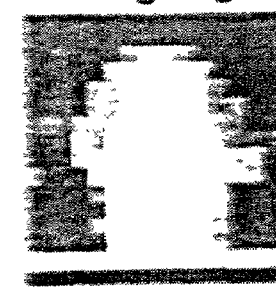 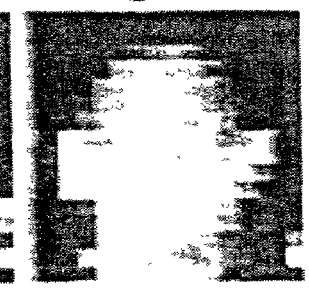
Fig. 1i    Fig. 1j p(m, s)

| GRAPHIC ACCELERATOR ~100 | CPU ~102 | CLOCK ~104 | RESOLUTION ~106 | RANK ~108 |
|---|---|---|---|---|
| 1 | — | — | r≦1200×1200 | A |
| | ○○○ | 750≦CL | r≦1200×1200 | |
| | △△△ | 600≦CL | r≦1200×1200 | |
| | ○○○ | 400≦CL≦750 | r≦600×600 | B |
| | △△△ | 250≦CL≦600 | r≦600×600 | |
| 0 | ~ | ~ | ~ | |
| | ○○○ | CL≦80 | MOVIE FILE | |
| | △△△ | CL≦60 | MOVIE FILE | |
| | OTHERS | — | MOVIE FILE | X |

IMAGE GENERATING METHOD, APPARATUS AND SYSTEM USING CRITICAL POINTS

BACKGROUND OF THE INVENTION

1. Field of the Invention

The present invention relates to an image generating technique, and more particularly relates to a method, apparatus and system for generating images by utilizing critical points and interpolation techniques.

2. Description of the Related Art

As a part of the digital revolution, many users have come to enjoy services on the Internet from personal computers and portable telephones. The digital revolution is now spreading to broadcast services and movies, including digital satellite broadcasts. Thus, a barrier that had previously existed between broadcasting and communications is quickly beginning to disappear. Moreover, as broadband communications grow, multimedia content and culture will experience significant development, and, as a part of this multimedia culture, the distribution of video or motion pictures will become a key technology.

When humans acquire information from the outside world, images are capable of conveying much more information than audio. Besides being used for entertainment and recreational purposes, it is believed that images will also serve as a vital part of a software infrastructure which will support a wide range of aspects of human life and culture. As images are used more and more in a digital form, image-effect technology will expand into many fields with additional applications in computer graphics (CG) and image processing technologies.

One of the most important areas in image processing is that of compression and compression coding techniques. As an example, the MPEG (Motion Picture Expert Group) compression coding format is well known. The MPEG format has evolved through MPEG 1, MPEG 2 and MPEG 4, and it is scheduled to further evolve in the future. However, MPEG and other compression technologies may be susceptible to the so-called block noise problem and there may also be issues regarding consistency of the compressibility when dealing with high-quality images.

SUMMARY OF THE INVENTION

The present invention has been made in view of the foregoing circumstances and an object thereof is to provide a technique by which to generate relatively high-quality motion pictures with a relatively small amount of data and with appropriate quality for each individual user.

An embodiment according to the present invention relates to an image generating method. In this method, intermediate frames are generated based on key frames and corresponding point data related to the key frames. The method includes: determining a processing performance of an apparatus which generates the intermediate frames; and determining resolution of the intermediate frames to be generated in accordance with the determined processing performance. Moreover, the method may further include generating intermediate frames according to the determined resolution and, further, displaying the frames.

The corresponding point data may be generated by utilizing an image matching technique (hereinafter referred to as the "base technology") proposed by Japanese Patent No. 2927350 assigned to the same assignee of the present invention, but is not limited thereto.

For the purpose of determining the processing performance, various factors may be considered, such as, for example, determining if there is an optional accelerator, such as a graphics or mathematical accelerator, determining the processing speed or type of CPU, or some combination of these or other appropriate factors. Moreover, intermediate frames may be experimentally generated by an image generating apparatus, so that conditions thereof, such as the time required to generate the intermediate frames, may be measured.

The method according to this embodiment may further include: generating the corresponding point data by using a multiresolutional critical point filter.

Another embodiment of the present invention also relates to a similar image generating method. This method includes: determining a processing performance of an apparatus which generates intermediate frames; determining a resolution of the intermediate frames which belongs to a range in which real-time reproduction is possible using the determined processing performance; and generating the intermediate frames at the determined resolution. The method may further include: generating the intermediate frames at a lower speed in the event that it is determined that real-time reproduction/generation is difficult even at lower resolution; and converting the generated intermediate frames to a movie file so as to be recorded.

Still another embodiment of the present invention relates to an image generating apparatus for generating intermediate frames based on key frames and corresponding point data. This apparatus includes: a performance specifying unit which determines a processing performance of the apparatus; and a resolution decision unit which determines a resolution of the intermediate frames to be generated according to the determined processing performance. The apparatus may further include an intermediate frame generator which generates intermediate frames according to the determined resolution and may also include a display device.

Still another embodiment of the present invention relates also to a similar image generating apparatus. This apparatus includes: a performance specifying unit which determines a processing performance of the apparatus or of an intermediate frame generator that generates intermediate frames; a resolution decision unit which determines a resolution of the intermediate frames at which real-time generation/reproduction is possible using the determined processing performance; and the intermediate frame generator which generates the intermediate frames at the determined resolution. Moreover, in a case where it is determined that real-time generation is only possible below a predetermined resolution, the resolution decision unit may notify the intermediate frame generator to abandon real-time processing and to generate the intermediate frames at a predetermined higher resolution (lower speed). In this case, the apparatus may further include a converter which converts the generated intermediate frames to a movie file so as to be recorded for later display or the like.

In the embodiments of the invention, the performance specifying unit may also determine the processing performance based on a user's instruction, either separate from or in addition to the other factors described above.

Still another embodiment of the present invention relates to a client-server system. In this system, a server includes: a storage unit which stores key frames and corresponding point data therefor; and a communication unit which transmits the key frames and the corresponding point data to a client. The client includes: a communication unit which acquires the transmitted key frames and corresponding point data; and a client storage unit which stores the acquired key frames and corresponding point data. Moreover, the server or client also includes a performance specifying unit, which determines a processing performance of the client, and a resolution decision unit, which determines a resolution of intermediate frames which are capable of being reproduced at a desired speed using the determined processing performance; and the client further includes: an intermediate frame generator which generates the intermediate frames at the determined resolution. The server may compute a matching between the key frames by extracting critical points thereof based on, for example, the base technology, so as to generate the corresponding point data.

It is to be noted that the base technology is not a prerequisite in the present invention. Moreover, it is also possible to have replacement or substitution of the above-described components, elements, functions or processes in part or whole as between method and apparatus or to add components, elements, functions or processes to method or apparatus. Also, it will be understood that the components, elements, functions or processes may be implemented by a computer program and saved on a recording medium or the like and are all effective as and encompassed by the present invention.

Moreover, this summary of the invention includes features that may not be necessary features such that an embodiment of the present invention may also be a sub-combination of these described features.

BRIEF DESCRIPTION OF THE DRAWINGS

FIG. 1($a$) is an image obtained as a result of the application of an averaging filter to a human facial image.

FIG. 1($b$) is an image obtained as a result of the application of an averaging filter to another human facial image.

FIG. 1($c$) is an image of a human face at $p^{(5,0)}$ obtained in a preferred embodiment in the base technology.

FIG. 1($d$) is another image of a human face at $p^{(5,0)}$ obtained in a preferred embodiment in the base technology.

FIG. 1($e$) is an image of a human face at $p^{(5,1)}$ obtained in a preferred embodiment in the base technology.

FIG. 1($f$) is another image of a human face at $p^{(5,1)}$ obtained in a preferred embodiment in the base technology.

FIG. 1($g$) is an image of a human face at $p^{(5,2)}$ obtained in a preferred embodiment in the base technology.

FIG. 1($h$) is another image of a human face at $p^{(5,2)}$ obtained in a preferred embodiment in the base technology.

FIG. 1($i$) is an image of a human face at $p^{(5,3)}$ obtained in a preferred embodiment in the base technology.

FIG. 1($j$) is another image of a human face at $p^{(5,3)}$ obtained in a preferred embodiment in the base technology.

FIG. 5($b$) is a diagram illustrating determination of whether or not the mapping for a certain point satisfies the bijectivity condition through the outer product computation.

FIG. 9 is a diagram showing correspondence between partial images of the m-th and (m−1)th levels of resolution.

FIG. 19 shows an example correspondence table for the image generating apparatus.

DETAILED DESCRIPTION OF THE INVENTION

Figure 2R:
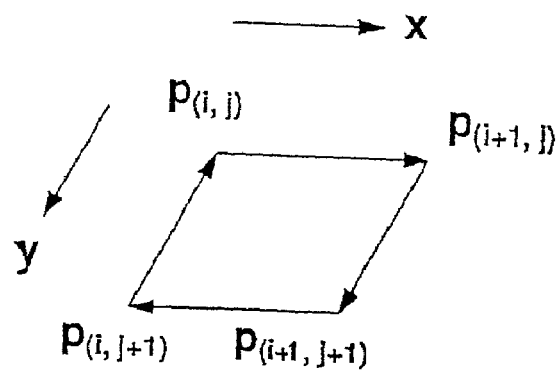
FIG. 2(R) shows an original quadrilateral.
Figure 2A:
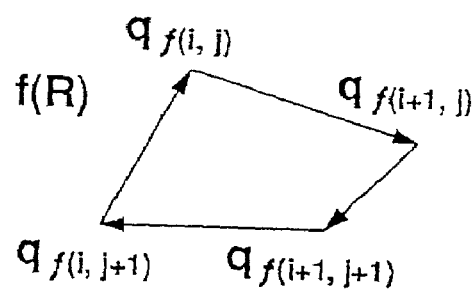
FIG. 2(A) shows an inherited quadrilateral.
Figure 2E:
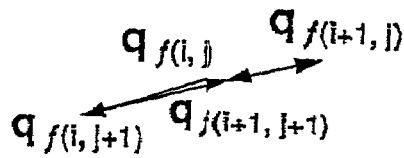
FIG. 2(E) shows an inherited quadrilateral.
Figure 2B:
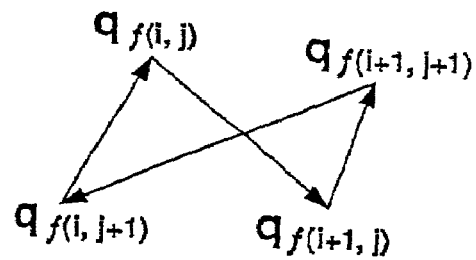
FIG. 2(B) shows an inherited quadrilateral.
Figure 2D:
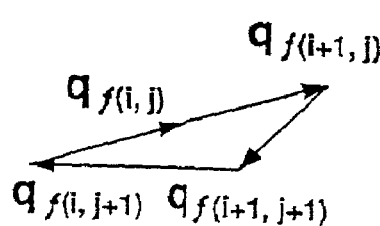
FIG. 2(D) shows an inherited quadrilateral.
Figure 2C:
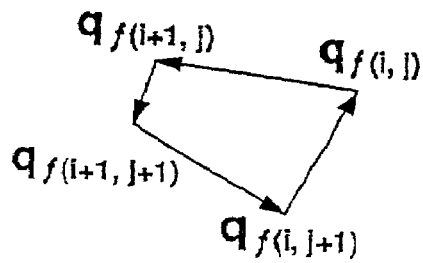
FIG. 2(C) shows an inherited quadrilateral.

The invention will now be described based on the preferred embodiments, which are not intended to limit the scope of the present invention, but exemplify the invention. All of the features and the combinations thereof described in the embodiment are not necessarily essential to the invention.

First, the multiresolutional critical point filter technology and the image matching processing using the technology, both of which will be utilized in the preferred embodiments, will be described in detail as "Base Technology". Namely, the following sections [1] and [2] (below) belong to the base technology, where section [1] describes elemental techniques and section [2] describes a processing procedure. These techniques are patented under Japanese Patent No. 2927350 and owned by the same assignees of the present invention. However, it is to be noted that the image matching techniques provided in the present embodiments are not limited to the same levels. In particular, in FIGS. 18 to 20, image effect and image interpolation techniques and apparatus representing embodiments of the present invention and utilizing the base technology will be described in more detail.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution. Initially, let the width of an image to be examined be N and the height of the image be M. For simplicity, assume that $N=M=2n$ where n is a positive integer. An interval $[0, N] \subset R$ is denoted by I. A pixel of the image at position (i, j) is denoted by $p^{(i,j)}$ where $i,j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutinal filter then extracts the critical points from the original image to construct another image having a lower resolution. Here, the size of each of the respective images of the m-th level is denoted as $2^m \times 2^m$ ($0 \leq m \leq n$). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)})) \quad (1)$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to $\alpha$ and $\beta$, respectively, the subimages can be expressed as follows:

$P^{(m,0)} = \alpha(x)\alpha(y)p^{(m+1,0)}$ $P^{(m,1)} = \alpha(x)\beta(y)p^{(m+1,1)}$ $P^{(m,2)} = \beta(x)\alpha(y)p^{(m+1,2)}$ $P^{(m,2)} = \beta(x)\beta(y)p^{(m+1,3)}$ Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels.

In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $p_{(i,j)}^{(n)}$ and that of the destination image at (k,l) is denoted by $q_{(k,l)}^{(n)}$ where i, j, k, l ∈I. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}: p^{(m,0)} \to q^{(m,0)}$ between $p^{(m,0)}$ and $q^{(m,0)}$ with the minimum energy is computed. Based on $f^{(m,0)}$ the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0, 1, 2, . . . ) is referred to as a submapping. The order of i will be rearranged as shown in the following equation (3) in computing $f^{(m,i)}$ for reasons to be described later.

$$f^{(m,i)}:p^{(m,\sigma(i))} \to q^{(m,\sigma(i))} \quad (3)$$

where $\sigma(i) \in \{0, 1, 2, 3\}$.

[1.3.1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base technology, a pixel is specified by a co-ordinate point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ ($s=0, 1, \ldots$) where $$f^{(m,s)}_{(i,j)} = (k, l)$$

means that $p^{(m,s)}_{(i,j)}$ of the source image is mapped to $q^{(m,s)}_{(k,l)}$ of the destination image. For simplicity, when $f(i,j)=(k,l)$ holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p^{(m,s)}_{(i,j)} p^{(m,s)}_{(i+1,j)} p^{(m,s)}_{(i+1,j+1)} p^{(m,s)}_{(i,j+1)} \quad (4)$$

where $i=0, \ldots, 2^m-1$, and $j=0, \ldots, 2^m-1$. The edges of R are directed as follows:

$$\overrightarrow{p^{(m,s)}_{(i,j)} p^{(m,s)}_{(i+1,j)}}, \overrightarrow{p^{(m,s)}_{(i+1,j)} p^{(m,s)}_{(i+1,j+1)}}, \overrightarrow{p^{(m,s)}_{(i+1,j+1)} p^{(m,s)}_{(i,j+1)}}, \text{ and } \overrightarrow{p^{(m,s)}_{(i,j+1)} p^{(m,s)}_{(i,j)}} \quad (5)$$

This square region R will be mapped by f to a quadrilateral on the destination image plane:

$$q^{(m,s)}_{f(i,j)} q^{(m,s)}_{f(i+1,j)} q^{(m,s)}_{f(i+1,j+1)} q^{(m,s)}_{f(i,j+1)} \quad (6)$$

This mapping $f^{(m,s)}(R)$, that is, $$f^{(m,s)}(R) = f^{(m,s)}(p^{(m,s)}_{(i,j)} p^{(m,s)}_{(i+1,j)} p^{(m,s)}_{(i+1,j+1)} p^{(m,s)}_{(i,j+1)}) = q^{(m,s)}_{f(i,j)} q^{(m,s)}_{f(i+1,j)} q^{(m,s)}_{f(i+1,j+1)} q^{(m,s)}_{f(i,j+1)}$$

should satisfy the following bijectivity conditions (referred to as BC hereinafter):

1. The edges of the quadrilateral $f^{(m,s)}(R)$ should not intersect one another.
2. The orientation of the edges of $f^{(m,s)}(R)$ should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}(R)$ may be zero. Namely, $f^{(m,s)}(R)$ may be a triangle. However, $f^{(m,s)}(R)$ is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, $f(i,j)=(i,j)$ (on the four lines of $i=0$, $i=2^m-1$, $j=0$, $j=2^m-1$). This condition will be hereinafter referred to as an additional condition.

[1.3.2] Energy of Mapping

[1.3.2.1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $C^{(m,s)}_{(i,j)}$ of the mapping $f^{(m,s)}$ at $(i,j)$ is determined by the following equation (7).

$$C^{(m,s)}_{(i,j)} = |V(p^{(m,s)}_{(i,j)}) - V(q^{(m,s)}_{f(i,j)})|^2 \quad (7)$$

where $V(p^{(m,s)}_{(i,j)})$ and $V(q^{(m,s)}_{f(i,j)})$ are the intensity values of the pixels $p^{(m,s)}_{(i,j)}$ and $q^{(m,s)}_{f(i,j)}$, respectively. The total energy $C^{(m,s)}$ of f is a matching evaluation equation, and can be defined as the sum of $C^{(m,s)}_{(i,j)}$ as shown in the following equation (8).

$$C^{(m,s)}_f = \sum_{i=0}^{i=2^m-1} \sum_{j=0}^{j=2^m-1} C^{(m,s)}_{(i,j)} \quad (8)$$

[1.3.2.2] Cost Related to the Locations of the Pixel for Smooth Mapping

In order to obtain smooth mappings, another energy $D_f$ for the mapping is introduced. The energy $D_f$ is determined by the locations of $p^{(m,s)}_{(i,j)}$ and $q^{(m,s)}_{f(i,j)}$ ($i=0, 1, \ldots, 2^m-1, j=0, 1, \ldots, 2^m-1$), regardless of the intensity of the pixels. The energy $D^{(m,s)}_{(i,j)}$ of the mapping $f^{(m,s)}$ at a point $(i,j)$ is determined by the following equation (9).

$$D^{(m,s)}_{(i,j)} = \eta E^{(m,s)}_{0_{(i,j)}} + E^{(m,s)}_{1_{(i,j)}} \quad (9)$$

where the coefficient parameter $\eta$ which is equal to or greater than 0 is a real number. And we have $$E^{(m,s)}_{0_{(i,j)}} = \|(i,j) - f^{(m,s)}(i,j)\|^2 \quad (10)$$

-continued $$E_{1(i,j)}^{(m,s)} = \sum_{i'=i-1}^{i} \sum_{j'=j-1}^{j} \|(f^{(m,s)}(i,j)-(i,j))-(f^{(m,s)}(i',j')-(i',j'))\|^2/4 \quad (11)$$

where $$\|(x,y)\| = \sqrt{x^2+y^2}, \quad (12)$$

i' and j' are integers and f(i',j') is defined to be zero for i'<0 and j'<0. $E_0$ is determined by the distance between (i,j) and f(i,j). $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of p(i,j) and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \quad (13)$$

[1.3.2.3] Total Energy of the Mapping

The total energy of the mapping, that is, a combined evaluation equation which relates to the combination of a plurality of evaluations, is defined as $\lambda C_f^{(m,s)}+D_f^{(m,s)}$, where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)} + D_f^{(m,s)}\} \quad (14)$$

Care must be exercised in that the mapping becomes an identity mapping if $\lambda=0$ and $\eta=0$ (i.e., $f^{(m,s)}(i,j)=(i,j)$ for all $i=0, 1, \ldots, 2^m-1$ and $j=0, 1, \ldots, 2^m-1$). As will be described later, the mapping can be gradually modified or transformed from an identity mapping since the case of $\lambda=0$ and $\eta=0$ is evaluated at the outset in the base technology. If the combined evaluation equation is defined as $C_f^{(m,s)}+\lambda D_f^{(m,s)}$ where the original position of $\lambda$ is changed as such, the equation with $\lambda=0$ and $\eta=0$ will be $C_f^{(m,s)}$ only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1.3.3] Determining the Mapping with Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{j}{2} \right\rfloor\right), \quad (15)$$

where $\lfloor x \rfloor$ denotes the largest integer not exceeding x, $p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$. Conversely, $p_{(i,j)}^{(m,s)}$ and $q_{(i,j)}^{(m,s)}$ are the child of $p_{(i',j')}^{(m-1,s)}$ and the child of $q_{(i',j')}^{(m-1,s)}$, respectively. A function parent (i,j) is defined by the following equation (16):

$$\text{parent}(i,j) = \left(\left\lfloor \frac{i}{2} \right\rfloor, \left\lfloor \frac{j}{2} \right\rfloor\right) \quad (16)$$

Now, a mapping between $p_{(i,j)}^{(m,s)}$ and $q_{(k,l)}^{(m,s)}$ is determined by computing the energy and finding the minimum thereof. The value of $f^{(m,s)}(i,j)=(k,l)$ is determined as follows using f(m−1,s) (m=1, 2, . . . , n). First of all, a condition is imposed that $q_{(k,l)}^{(m,s)}$ should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \quad (17)$$

where $$g^{(m,s)}(i,j)=f^{(m-1,s)}(\text{parent}(i,j))+f^{(m-1,s)}(\text{parent}(i,j)+(1,1)) \quad (18)$$

The quadrilateral defined above is hereinafter referred to as the inherited quadrilateral of $p_{(i,j)}^{(m,s)}$. The pixel minimizing the energy is sought and obtained inside the inherited quadrilateral.

Figure 3:
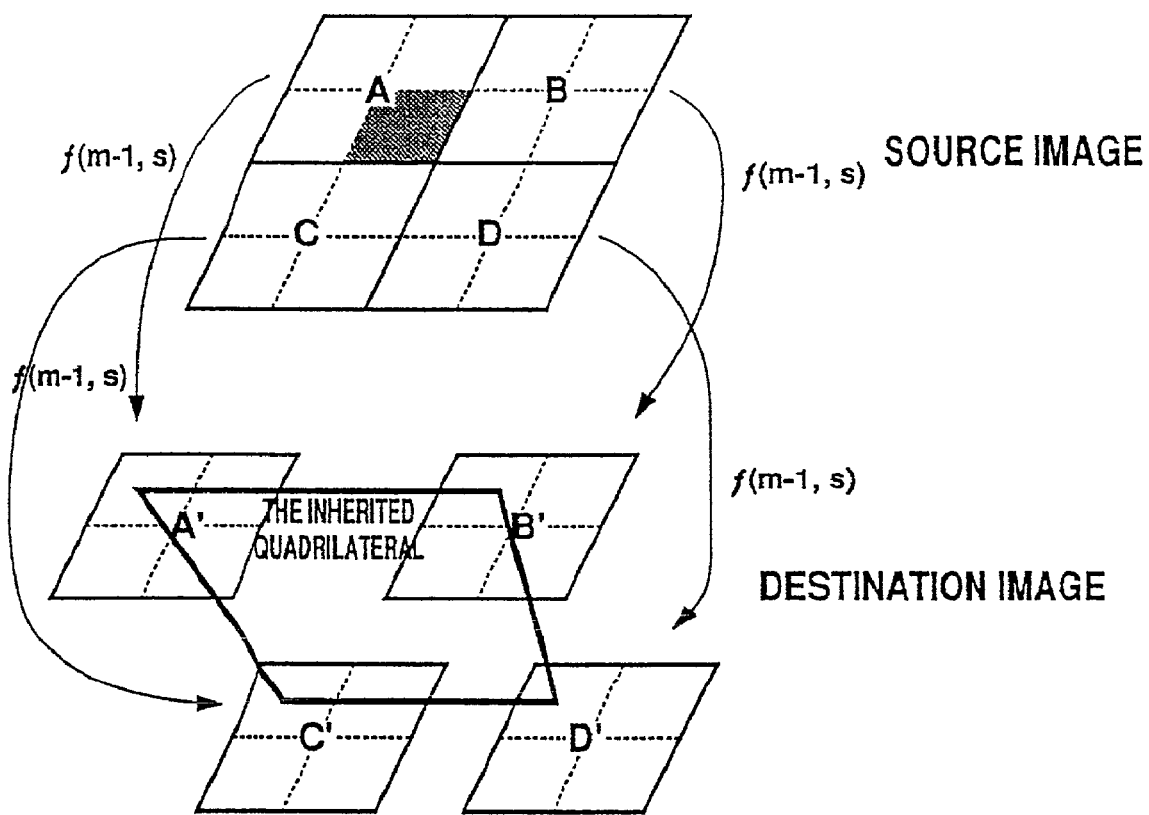
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0(i,j)}=\|f^{(m,0)}(i,j)-g^{(m)}(i,j)\|^2 \quad (19)$$

$$E_{0(i,j)}=\|f^{(m,s)}(i,j)-f^{(m,s-1)}(i,j)\|^2, (1 \leq i) \quad (20)$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m-1) the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $L_{max}^{(m)}$. $L_{max}^{(m)}$ is fixed for each level m. If no pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1.4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the base technology, the optimal parameter values can be obtained completely automatically.

The systems according to this base technology include two parameters, namely, $\lambda$ and $\eta$, where $\lambda$ and $\eta$ represent the weight of the difference of the pixel intensity and the stiffness of the mapping, respectively. In order to automatically determine these parameters, the are initially set to 0. First, $\lambda$ is gradually increased from $\lambda=0$ while $\eta$ is fixed at 0. As $\lambda$ becomes larger and the value of the combined evaluation equation (equation (14)) is minimized, the value of $C_f^{(m,s)}$ for each submapping generally becomes smaller. This basically means that the two images are matched better. However, if $\lambda$ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $D_f^{(m,s)}$ in equation (14) tends to increase abruptly.
4. As a result, since the value of equation (14) tends to increase abruptly, $f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which equation (14) takes the minimum value with $\lambda$ being increased is kept. Such $\lambda$ is determined as the optimal value at $\eta=0$. Next, the behavior of $C_f^{(m,s)}$ is examined while $\eta$ is increased gradually, and $\eta$ will be automatically determined by a method described later. $\lambda$ will then again be determined corresponding to such an automatically determined $\eta$.

The above-described method resembles the focusing mechanism of human visual systems. In the human visual systems, the images of the respective right eye and left eye are matched while moving one eye. When the objects are clearly recognized, the moving eye is fixed.

[1.4.1] Dynamic Determination of $\lambda$

Initially, $\lambda$ is increased from 0 at a certain interval, and a subimage is evaluated each time the value of $\lambda$ changes. As shown in equation (14), the total energy is defined by $\lambda C_f^{(m,s)} + D_f^{(m,s)}$. $D_{(i,j)}^{(m,s)}$ in equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases in normal cases as $\lambda$ increases. The histogram of $C_{(i,j)}^{(m,s)}$ is denoted as h(l), where h(l) is the number of pixels whose energy $C_{(i,j)}^{(m,s)}$ is $l^2$. In order that $\lambda l^2 \geq 1$ for example, the case of $l^2 = 1/\lambda$ is considered. When $\lambda$ varies from $\lambda_1$ to $\lambda_2$, a number of pixels (denoted A) expressed by the following equation (21):

$$A = \sum_{l=\lceil\frac{1}{\lambda_2}\rceil}^{\lfloor\frac{1}{\lambda_1}\rfloor} h(l) \cong \int_{l=\frac{1}{\lambda_2}}^{\frac{1}{\lambda_1}} h(l)\,dl = -\int_{\lambda_2}^{\lambda_1} h(l)\frac{1}{\lambda^{3/2}}\,d\lambda = \int_{\lambda_1}^{\lambda_2} \frac{h(l)}{\lambda^{3/2}}\,d\lambda \quad (21)$$

changes to a more stable state having the energy shown in equation (22):

$$C_f^{(m,s)} - l^2 = C_f^{(m,s)} - \frac{1}{\lambda}. \quad (22)$$

Here, it is assumed that the energy of these pixels is approximated to be zero. This means that the value of $C^{(i,j)(m,s)}$ changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since h(l)>0, $C_f^{(m,s)}$ decreases in the normal case. However, when λ exceeds the optimal value, the above phenomenon, that is, an increase in $C_f^{(m,s)}$ occurs. The optimal value of λ is determined by detecting this phenomenon.

When $$h(l) = Hl^k = \frac{H}{\lambda^{k/2}} \quad (25)$$

is assumed, where both H(H>0) and k are constants, the equation (26) holds:

$$\frac{\partial C_f^{(m,s)}}{\partial \lambda} = -\frac{H}{\lambda^{5/2+k/2}} \quad (26)$$

Then, if k≠−3, the following equation (27) holds:

$$C_f^{(m,s)} = C + \frac{H}{(3/2 + k/2)\lambda^{3/2+k/2}} \quad (27)$$

The equation (27) is a general equation of $C_f^{(m,s)}$ (where C is a constant).

When detecting the optimal value of λ, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l)=Hl^k$, the following equation (31), for example, $$B_0 \lambda^{3/2+k/2} = p_0 H \quad (31)$$

becomes a constant. However, when λ exceeds the optimal value, the above value of equation (31) increases abruptly. By detecting this phenomenon, i.e. whether or not the value of $B_0 \lambda^{3/2+k/2}/2^m$ exceeds an abnormal value $B_{0thres}$, the optimal value of λ can be determined. Similarly, whether or not the value of $B_1 \lambda^{3/2+k/2}/2^m$ exceeds an abnormal value $B_{1thres}$ can be used to check for an increasing rate $B_1$ of pixels violating the third condition of the BC. The reason why the factor $2^m$ is introduced here will be described at a later stage. This system is not sensitive to the two threshold values $B_{0thres}$ and $B_{1thres}$. The two threshold values $B_{0thres}$ and $B_{1thres}$ can be used to detect excessive distortion of the mapping which may not be detected through observation of the energy $C_f^{(m,s)}$.

In the experimentation, when λ exceeded 0.1 the computation of $f^{(m,s)}$ was stopped and the computation of $f^{(m,s+1)}$ was started. That is because the computation of submappings is affected by a difference of only 3 out of 255 levels in pixel intensity when λ>0.1 and it is then difficult to obtain a correct result.

[1.4.2] Histogram h(l)

The examination of $C_f^{(m,s)}$ does not depend on the histogram h(l), however, the examination of the BC and its third condition may be affected by h(l). When (λ, $C_f^{(m,s)}$) is actually plotted, k is usually close to 1. In the experiment, k=1 is used, that is, $B_0 \lambda^2$ and $B_1 \lambda^2$ are examined. If the true value of k is less than 1, $B_0 \lambda^2$ and $B_1 \lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_{0thres}$ appropriately.

Let us model the source image by a circular object, with its center at $(x_0, y_0)$ and its radius r, given by:

$$p(i,j) = \begin{cases} \frac{255}{r} c\left(\sqrt{(i-x_0)^2 + (j-y_0)^2}\right) \dots \left(\sqrt{(i-x_0)^2 + (j-y_0)^2} \le r\right) \\ 0 \dots \text{(otherwise)} \end{cases} \quad (32)$$

and the destination image given by:

$$q(i,j) = \begin{cases} \frac{255}{r} c\left(\sqrt{(i-x_1)^2 + (j-y_1)^2}\right) \dots \left(\sqrt{(i-x_1)^2 + (j-y_1)^2} \le r\right) \\ 0 \dots \text{(otherwise)} \end{cases} \quad (33)$$

with its center at $(x_1, y_1)$ and radius r. In the above, let c(x) have the form of $c(x)=x^k$. When the centers $(x_0, y_0)$ and $(x_1, y_1)$ are sufficiently far from each other, the histogram h(l) is then in the form:

$$h(l) \propto rl^k (k \ne 0) \quad (34)$$

When k=1, the images represent objects with clear boundaries embedded in the background. These objects become darker toward their centers and brighter toward their boundaries. When k=−1, the images represent objects with vague boundaries. These objects are brightest at their centers, and become darker toward their boundaries. Without much loss of generality, it suffices to state that objects in images are generally between these two types of objects. Thus, choosing k such that $-1 \le k \le 1$ can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1.4.3] Dynamic Determination of η

The parameter η can also be automatically determined in a similar manner. Initially, η is set to zero, and the final mapping $f^{(n)}$ and the energy $C_f^{(n)}$ at the finest resolution are computed. Then, after η is increased by a certain value Δη, the final mapping $f^{(n)}$ and the energy $C_f^{(n)}$ at the finest resolution are again computed. This process is repeated until the optimal value of η is obtained. η represents the stiffness of the mapping because it is a weight of the following equation (35):

$$E_{0(i,j)}^{(m,s)} = \|f^{(m,s)}(i,j) - f^{(m,s-1)}(i,j)\|^2 \quad (35)$$

Figure 4:
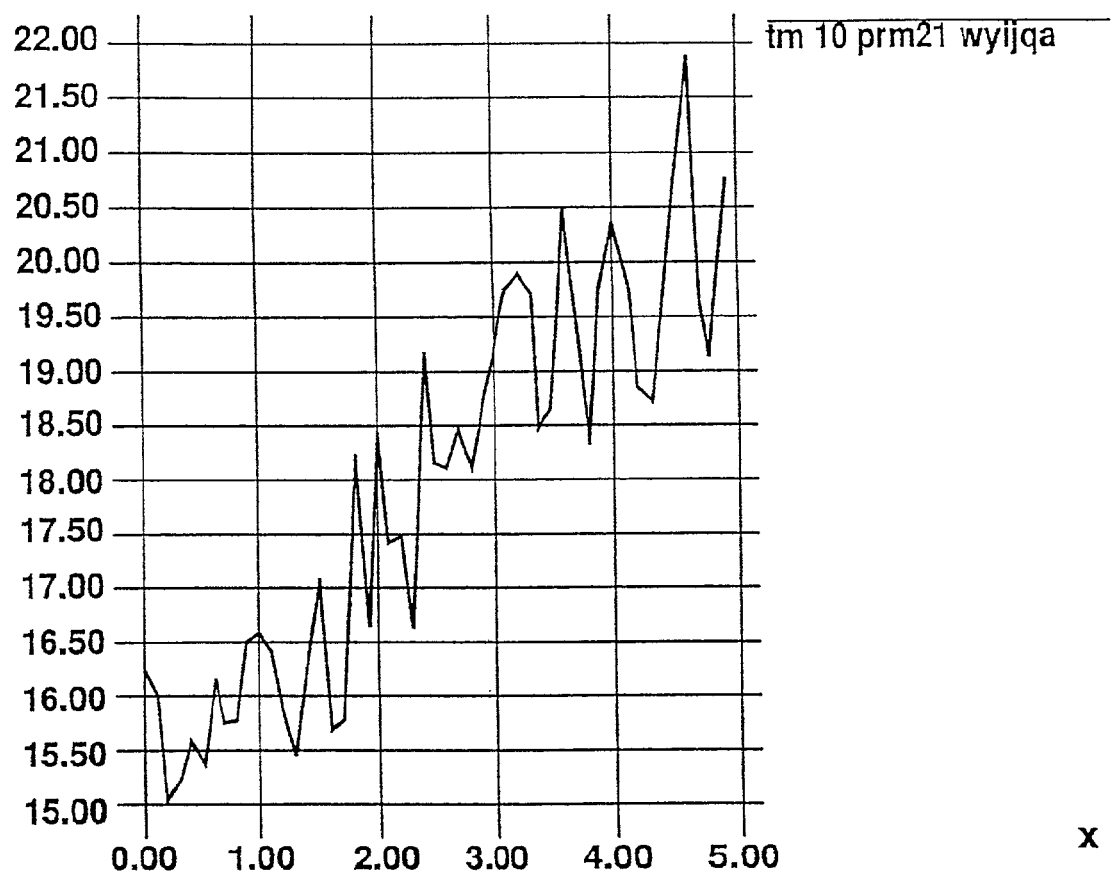
FIG. 4 shows the relationship between a parameter η (represented by x-axis) and energy $C_f$ (represented by y-axis).

If η is zero, $D_f^{(n)}$ is determined irrespective of the previous submapping, and the present submapping may be elastically deformed and become too distorted. On the other hand, if η is a very large value, $D_f^{(n)}$ is almost completely determined by the immediately previous submapping. The submappings are then very stiff, and the pixels are mapped to almost the same locations. The resulting mapping is therefore the identity mapping. When the value of η increases from 0, $C_f^{(n)}$ gradually decreases as will be described later. However, when the value of η exceeds the optimal value, the energy starts increasing as shown in FIG. 4. In FIG. 4, the x-axis represents η, and y-axis represents $C_f$.

The optimum value of η which minimizes $C_f^{(n)}$ can be obtained in this manner. However, since various elements affect this computation as compared to the case of λ, $C_f^{(n)}$ changes while slightly fluctuating. This difference is caused because a submapping is re-computed once in the case of λ whenever an input changes slightly, whereas all the submappings must be re-computed in the case of η. Thus, whether the obtained value of $C_f^{(n)}$ is the minimum or not cannot be determined as easily. When candidates for the minimum value are found, the true minimum needs to be searched by setting up further finer intervals.

[1.5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V(q_{f^{(m,s)}(i,j)}^{(m,s)}) \quad (36)$$

That is, supersampling is performed. In an example implementation, $f^{(m,s)}$ may take integer and half integer values, and $$V(q_{(i,j)+(0.5,0.5)}^{(m,s)}) \quad (37)$$

is given by $$(V(q_{(i,j)}^{(m,s)})+V(q_{(i,j)+(1,1)}^{(m,s)}))/2 \quad (38)$$

[1.6] Normalization of the Pixel Intensity of Each Image

When the source and destination images contain quite different objects, the raw pixel intensity may not be used to compute the mapping because a large difference in the pixel intensity causes excessively large energy $C_f^{(m,s)}$ and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1.7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}(i,j)$ is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}(i,j)$ (m=0, ..., n) that satisfy the BC are chosen as much as possible from the candidates (k, l) by imposing a penalty on the candidates violating the BC. The energy $D_{(k,l)}$ of a candidate that violates the third condition of the BC is multiplied by φ and that of a candidate that violates the first or second condition of the BC is multiplied by ψ. In this implementation, φ=2 and ψ=100000 are used.

In order to check the above-mentioned BC, the following test may be performed as the procedure when determining (k,l)=$f^{(m,s)}(i,j)$. Namely, for each grid point (k,l) in the inherited quadrilateral of $f^{(m,s)}(i,j)$, whether or not the z-component of the outer product of $$W = \vec{A} \times \vec{B} \quad (39)$$

is equal to or greater than 0 is examined, where $$\vec{A} = \overrightarrow{q_{f^{(m,s)}(i,j-1)}^{(m,s)} q_{f^{(m,s)}(i+1,j-1)}^{(m,s)}} \quad (40)$$

-continued $$\vec{B} = \overline{q_{f^{(m,s)}(i,j-1)}^{(m,s)} q_{(k,l)}^{(m,s)}} \qquad (41)$$

Here, the vectors are regarded as 3D vectors and the z-axis is defined in the orthogonal right-hand coordinate system. When W is negative, the candidate is imposed with a penalty by multiplying $D_{(k,l)}^{(m,s)}$ by $\psi$ so that it is not as likely to be selected.

Figure 5A:
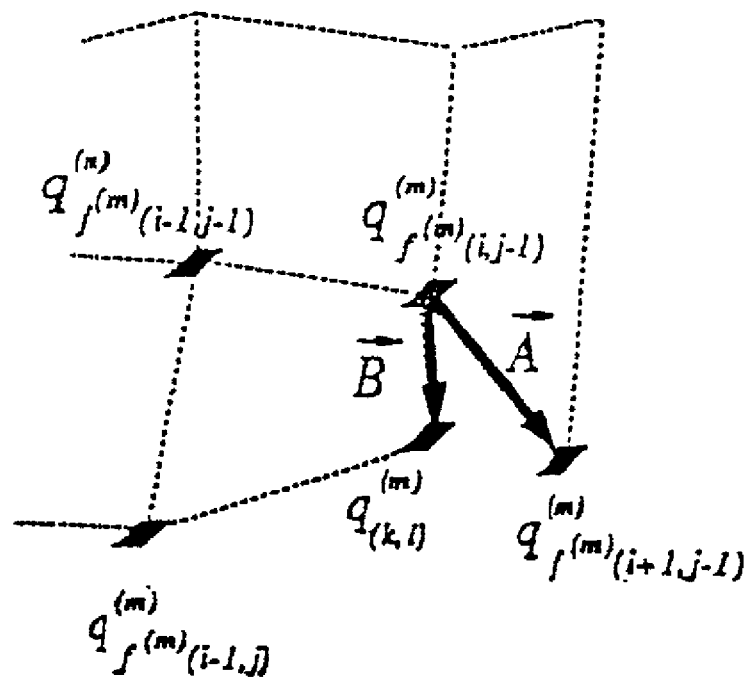
FIG. 5($a$) is a diagram illustrating determination of whether or not the mapping for a certain point satisfies the bijectivity condition through the outer product computation.
Figure 5B:
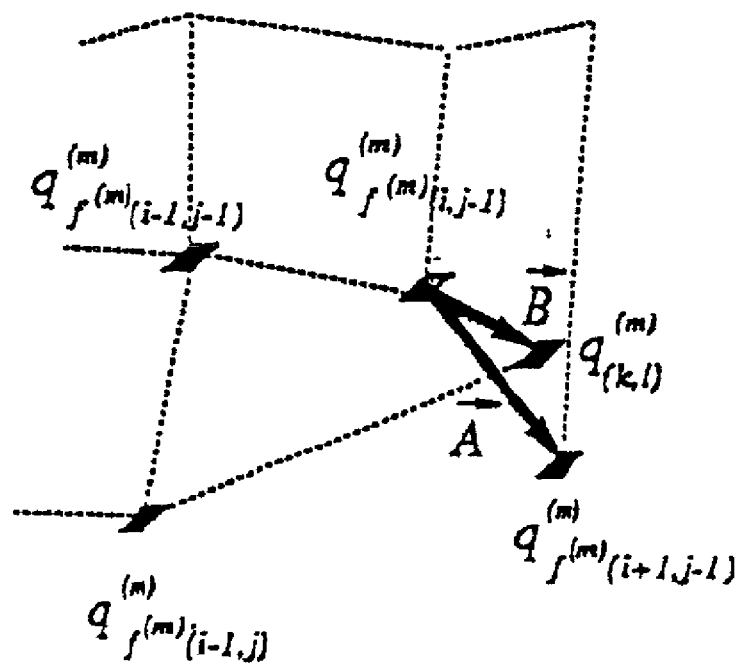

FIGS. 5(a) and 5(b) illustrate the reason why this condition is inspected. FIG. 5(a) shows a candidate without a penalty and FIG. 5(b) shows one with a penalty. When determining the mapping $f^{(m,s)}(i,j+1)$ for the adjacent pixel at (i,j+1), there is no pixel on the source image plane that satisfies the BC if the z-component of W is negative because then $q_{(k,l)}^{(m,s)}$ passes the boundary of the adjacent quadrilateral.

[1.7.1] The Order of Submappings

In this implementation, $\sigma(0)=0$, $\sigma(1)=1$, $\sigma(2)=2$, $\sigma(3)=3$, $\sigma(4)=0$ are used when the resolution level is even, while $\sigma(0)=3$, $\sigma(1)=2$, $\sigma(2)=1$, $\sigma(3)=0$, $\sigma(4)=3$ are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1.8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels $r(x,y,t)$ ($0 \leq x \leq N-1$, $0 \leq y \leq M-1$) whose distance from the source image plane is t ($0 \leq t \leq 1$) are obtained as follows. First, the location of the pixel $r(x,y,t)$, where $x,y,t \in R$, is determined by equation (42):

$$(x, y) = (1-dx)(1-dy)(1-t)(i, j) + (1-dx)(1-dy)tf(i, j) + \qquad (42)$$
$$dx(1-dy)(1-t)(i+1, j) + dx(1-dy)tf(i+1, j) +$$
$$(1-dx)dy(1-t)(i, j+1) + (1-dx)dytf(i, j+1) +$$
$$dxdy(1-t)(i+1, j+1) + dxdytf(i+1, j+1)$$

The value of the pixel intensity at $r(x,y,t)$ is then determined by equation (43):

$$V(r(x, y, t)) = (1-dx)(1-dy)(1-t)V(p_{(i,j)}) + (1-dx)(1-dy)tV(q_{f(i,j)}) + \qquad (43)$$
$$dx(1-dy)(1-t)V(p_{(i+1,j)}) + dx(1-dy)tV(q_{f(i+1,j)}) +$$
$$(1-dx)dy(1-t)V(p_{(i,j+1)}) + (1-dx)dytV(q_{f(i,j+1)}) +$$
$$dxdy(1-t)V(p_{(i+1,j+1)}) + dxdytV(q_{f(i+1,j+1)})$$

where dx and dy are parameters varying from 0 to 1.

[1.9] Mapping to which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0,j_0), p(i_1,j_1), \ldots, p(i_{n_s-1}, j_{n_s-1}) \qquad (44)$$

of the source image are specified, the following values in the equation (45) are determined.

$$F^{(n)}(i_0, j_0) = (k_0, l_0), \qquad (45)$$
$$F^{(n)}(i_1, j_1) = (k_1, l_1), \ldots,$$
$$F^{(n)}(i_{n_s-1}, j_{n_s-1}) = (k_{n_s-1}, l_{n_s-1})$$

For the remaining pixels of the source image, the amount of displacement is the weighted average of the displacement of $p(i_h,j_h)$ ($h=0, \ldots, n_s-1$). Namely, a pixel $p_{(i,j)}$ is mapped to the following pixel (expressed by the equation (46)) of the destination image.

$$F^{(m)}(i, j) = \frac{(i, j) + \sum_{h=0}^{h=n_s-1}(k_h - i_h, l_h - j_h)weight_h(i, j)}{2^{n-m}} \qquad (46)$$

where $$weight_h(i, j) = \frac{1/\|(i_h - i, j_h - j)\|^2}{total\_weight(i, j)} \qquad (47)$$

where

-continued $$\text{total\_weight}(i, j) = \sum_{h=0}^{h=n_s-1} 1/\|(i_h - i, j_h - j)\|^2 \quad (48)$$

Second, the energy $D_{(i,j)}^{(m,s)}$ of the candidate mapping f is changed so that a mapping f similar to $F^{(m)}$ has a lower energy. Precisely speaking, $D_{(i,j)}^{(m,s)}$ is expressed by the equation (49):

$$D_{(i,j)}^{(m,s)} = E_{0_{(i,j)}}^{(m,s)} + \eta E_{1_{(i,j)}}^{(m,s)} + \kappa E_{2_{(i,j)}}^{(m,s)} \quad (49)$$

where $$E_{2_{(i,j)}}^{(m,s)} = \begin{cases} 0, & \text{if} \|F^{(m)}(i,j) - f^{(m,s)}(i,j)\|^2 \leq \left\lfloor \dfrac{\rho^2}{2^{2(n-m)}} \right\rfloor \\ \|F^{(m)}(i,j) - f^{(m,s)}(i,j)\|^2, & \text{otherwise} \end{cases} \quad (50)$$

where $\kappa, \rho \geq 0$. Finally, the resulting mapping f is determined by the above-described automatic computing process.

Note that $E_{2_{(i,j)}}^{(m,s)}$ becomes 0 if $f^{(m,s)}(i,j)$ is sufficiently close to $F^{(m)}(i,j)$ i.e., the distance therebetween is equal to or less than $$\left\lfloor \dfrac{\rho^2}{2^{2(n-m)}} \right\rfloor \quad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
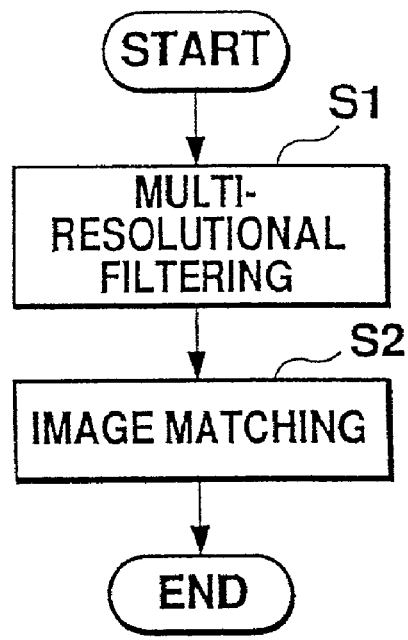
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
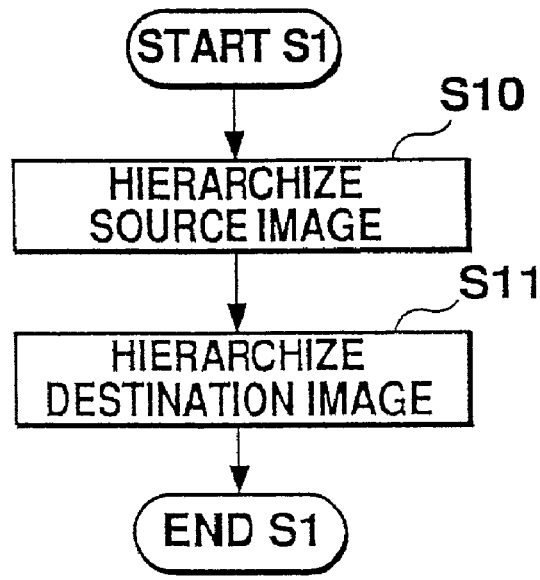
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
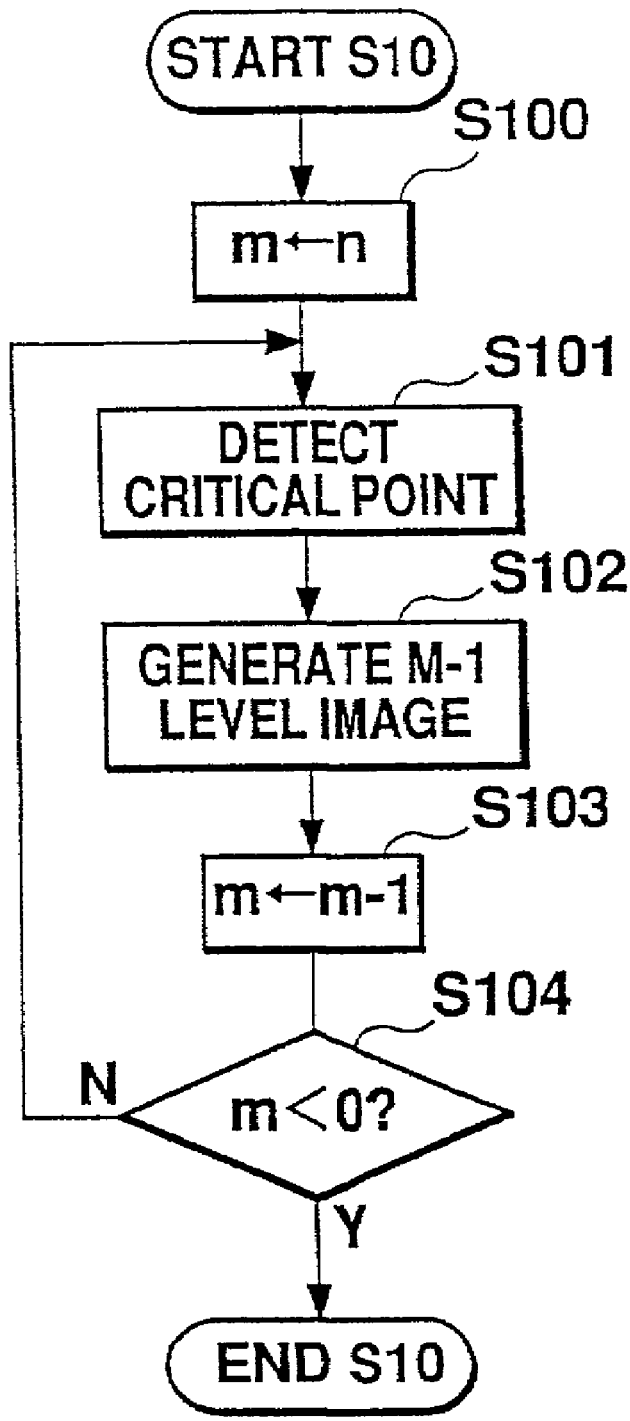
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ of the m-th level of resolution, using a critical point filter (S101), so that the images $p^{(m-1,0)}$, $p^{(m-1,1)}$, $p^{(m-1,2)}$ and $p^{(m-1,3)}$ of the (m-1)th level are generated (S102). Since m=n here, $p^{(m,0)}=p^{(m,1)}=p^{(m,2)}=p^{(m,3)}=p^{(n)}$ holds and four types of subimages are thus generated from a single source image.

Figure 9:
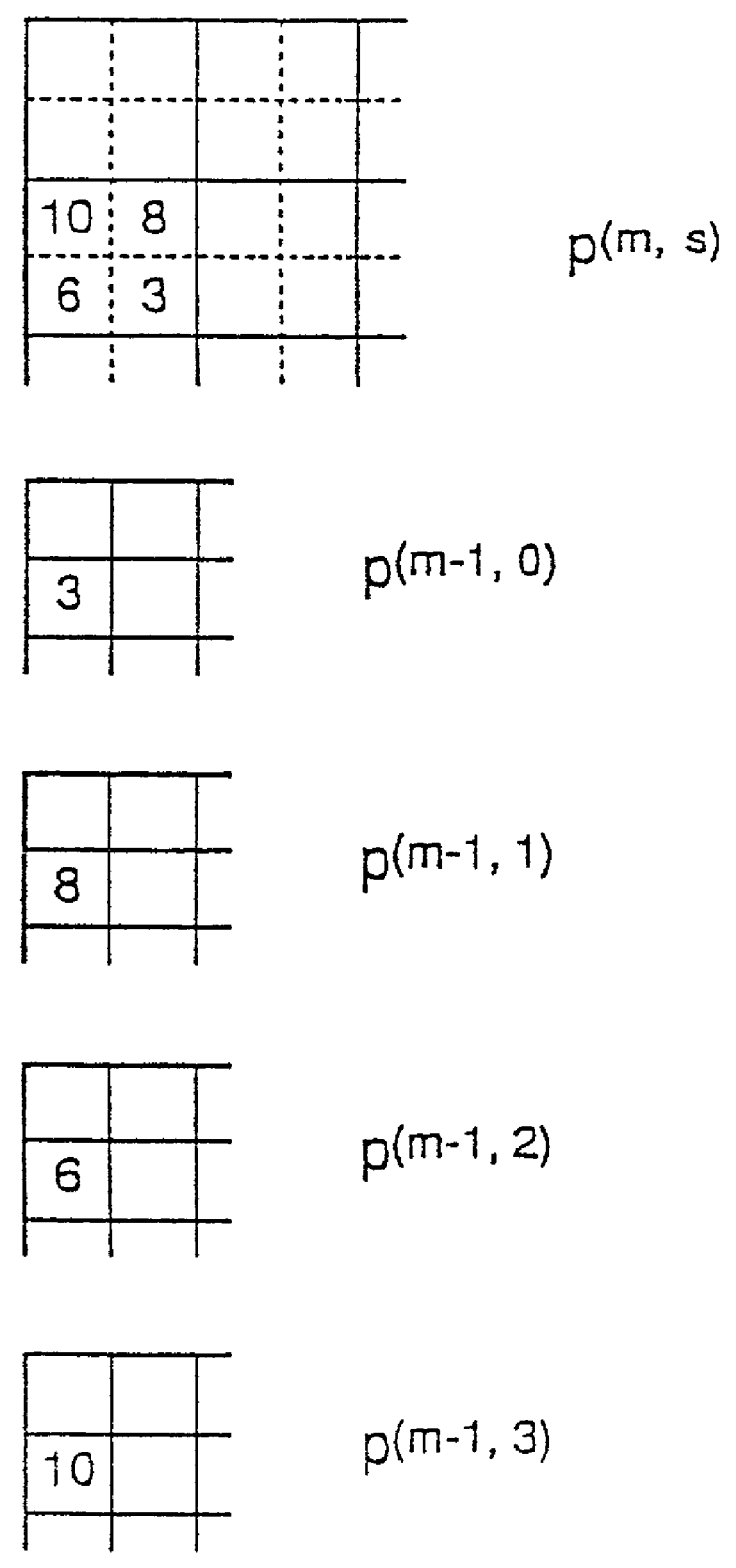

FIG. 9 shows correspondence between partial images of the m-th and those of (m-1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m-1)th level by respective single pixels thus acquired. Therefore, the size of the subimages at the (m-1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
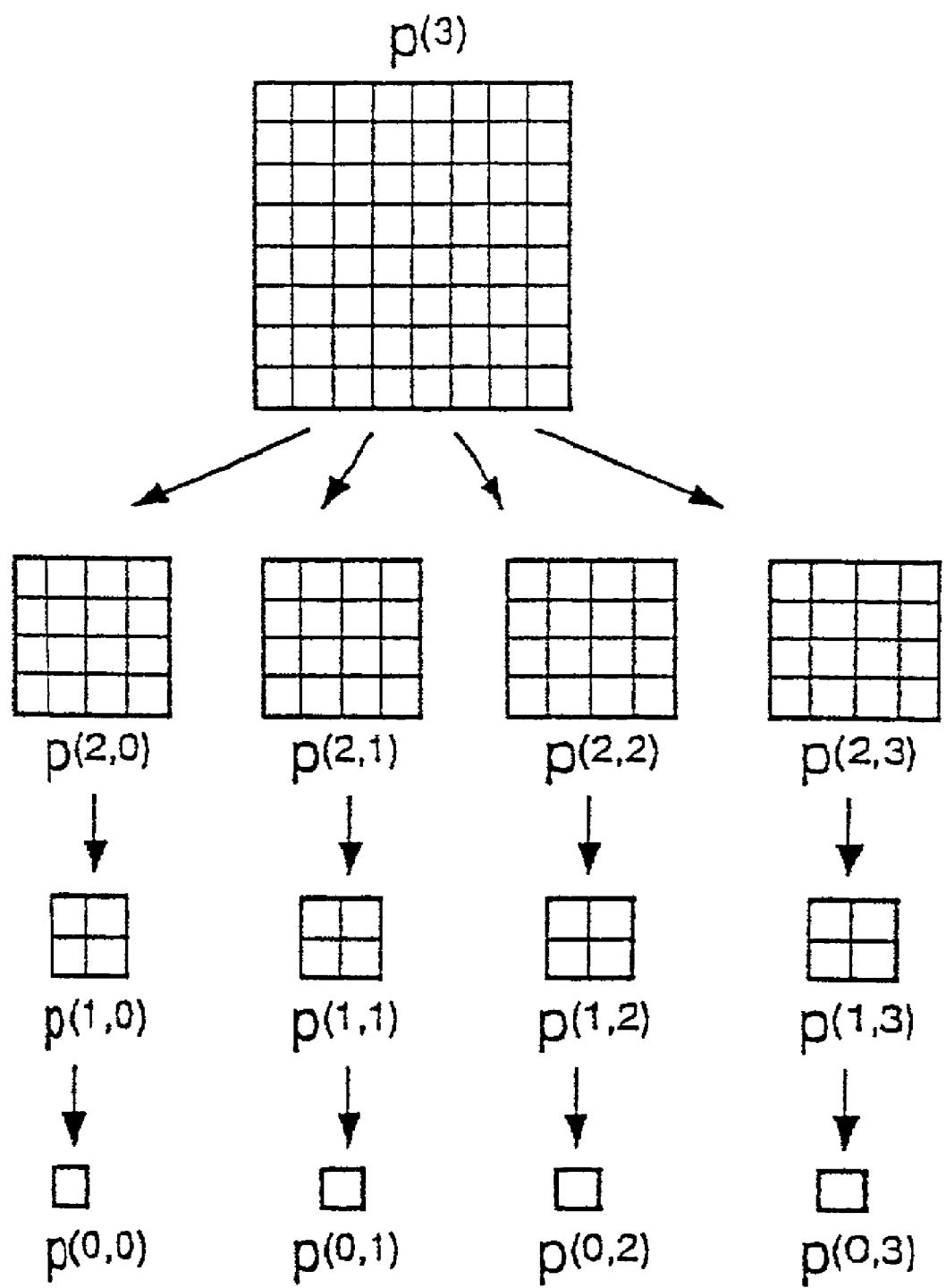
FIG. 10 is a diagram showing source images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
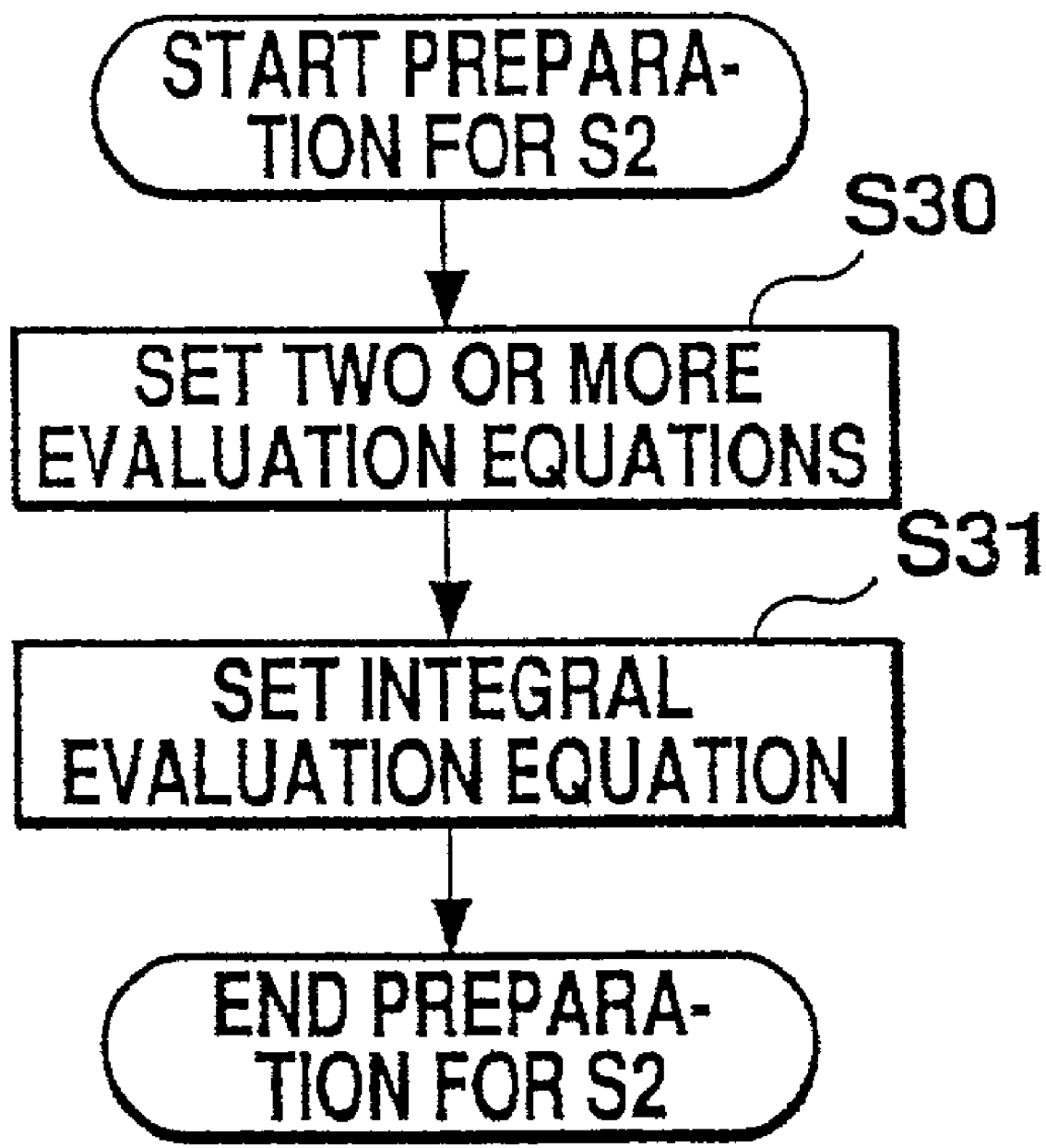
FIG. 11 is a flowchart of a preparation procedure for S2 in FIG. 6.

In this base technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such a combined evaluation equation may be $\lambda C_{(i,j)}^{(m,s)} + D_f^{(m,s)}$. Using $\eta$ introduced in [1.3.2.2], we have $$\Sigma\Sigma(\lambda C_{(i,j)}^{(m,s)} + \eta E_{0_{(i,j)}}^{(m,s)} + E_{1_{(i,j)}}^{(m,s)}) \quad (52)$$

In the equation (52) the sum is taken for each i and j where i and j run through 0, 1, ..., $2^{m-1}$. Now, the preparation for matching evaluation is completed.

Figure 12:
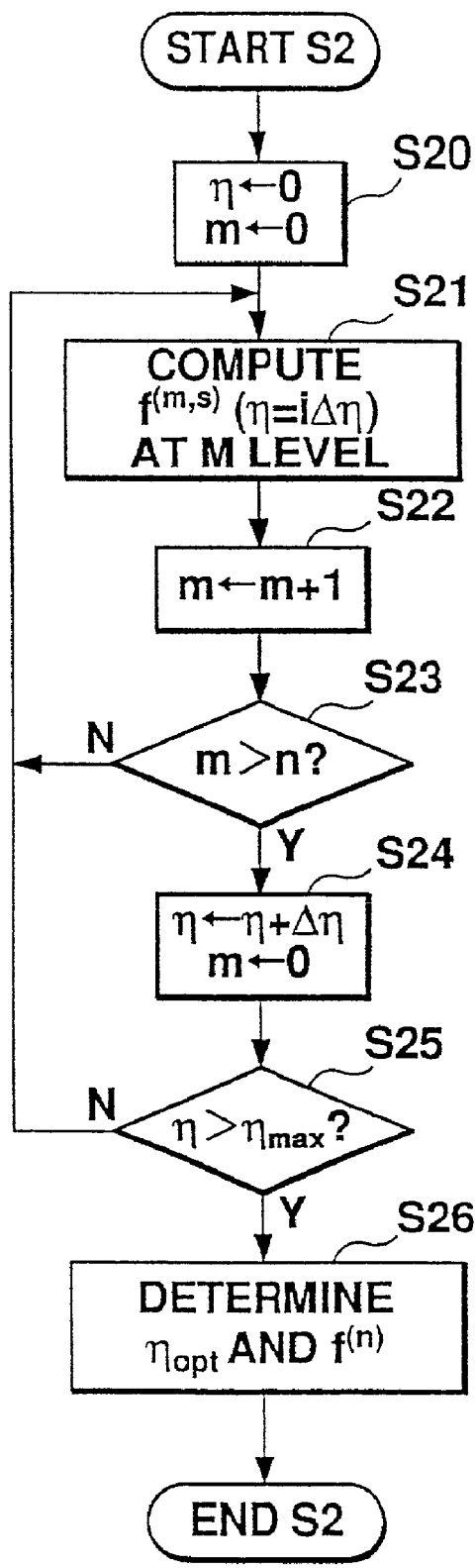
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter η and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m−1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained submappings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
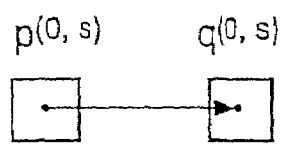
FIG. 13 is a diagram showing the way a submapping is determined at the 0-th level.
Figure 14:
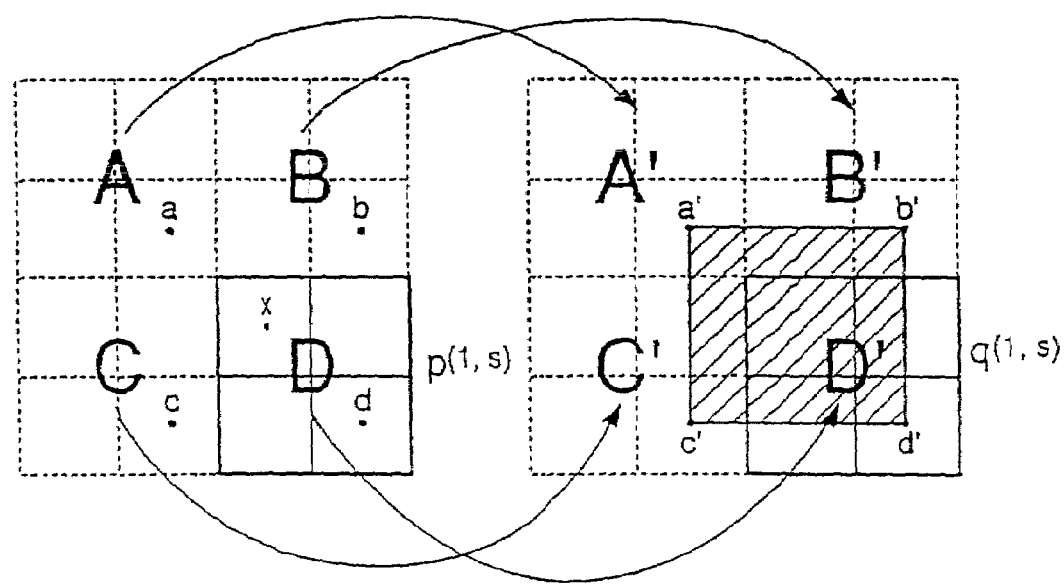
FIG. 14 is a diagram showing the way a submapping is determined at the first level.

FIG. 13 illustrates how the submapping is determined at the 0-th level. Since at the 0-th level each sub-image is consitituted by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}(\eta=0)$ because it has been determined relative to η=0.

Next, to obtain the mapping with respect to other different η, η is shifted by Δη and m is reset to zero (S24). After confirming that new η does not exceed a predetermined search-stop value $\eta_{max}$(S25), the process returns to S21 and the mapping $f^{(n)}$ (η=Δη) relative to the new η is obtained. This process is repeated while obtaining $f^{(n)}(\eta=i\Delta\eta)$ (i=0, 1, . . . ) at S21. When η exceeds $\eta_{max}$, the process proceeds to S26 and the optimal $\eta=\eta_{opt}$ is determined using a method described later, so as to let $f^{(n)}(\eta=\eta_{opt})$ be the final mapping $f^{(n)}$.

Figure 15:
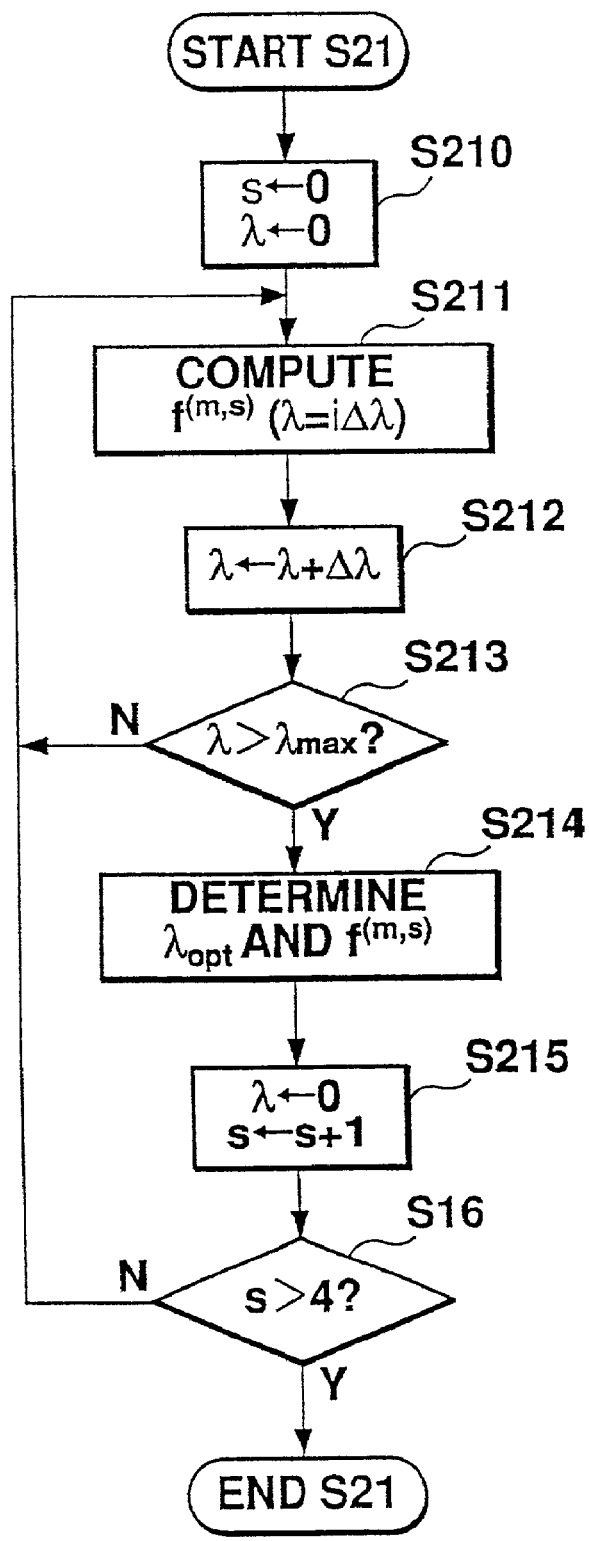
FIG. 15 is a flowchart showing the details of the process at S21 in FIG. 6.

FIG. 15 is a flowchart showing the details of the process of S21 shown in FIG. 12. According to this flowchart, the submappings at the m-th level are determined for a certain predetermined η. In this base technology, when determining the mappings, the optimal λ is defined independently for each submapping.

Referring to FIG. 15, s and λ are first reset to zero (S210). Then, obtained is the submapping $f^{(m,s)}$ that minimizes the energy with respect to the then λ (and, implicitly, η) (S211), and the thus obtained submapping is denoted as $f^{(m,s)}(\lambda=0)$. In order to obtain the mapping with respect to other different λ, λ is shifted by Δλ. After confirming that the new λ does not exceed a predetermined search-stop value $\lambda_{max}$ (S213), the process returns to S211 and the mapping $f^{(m,s)}$ (λ=Δλ) relative to the new λ is obtained. This process is repeated while obtaining $f^{(m,s)}(\lambda=i\Delta\lambda)$ (i=0, 1, . . . ). When λ exceeds $\lambda_{max}$, the process proceeds to S214 and the optimal $\lambda=\lambda_{opt}$ is determined, so as to let $f^{(n)}(\lambda=\lambda_{opt})$ be the final mapping $f^{(m,s)}$ (S214).

Next, in order to obtain other submappings at the same level, λ is reset to zero and s is incremented (S215). After confirming that s does not exceed 4 (S216), return to S211.

When s=4, $f^{(m,0)}$ is renewed utilizing $f^{(m,3)}$ as described above and a submapping at that level is determined.

Figure 16:
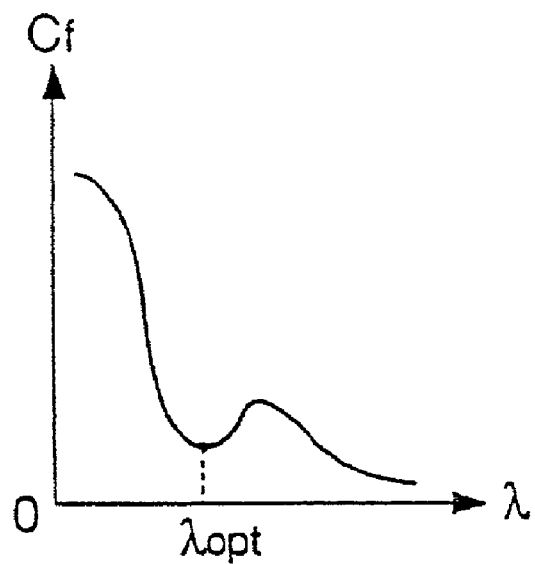
FIG. 16 is a graph showing the behavior of energy $C_f^{(m,s)}$ corresponding to $f^{(m,s)}$ ($\lambda=i\Delta\lambda$) which has been obtained for a certain $f^{(m,s)}$ while changing $\lambda$.

FIG. 16 shows the behavior of the energy $C_f^{(m,s)}$ corresponding to $f^{(m,s)}(\lambda=i\Delta\lambda)$ (i=0, 1, . . . ) for a certain m and s while varying $\lambda$. As described in [1.4], as $\lambda$ increases, $C_f^{(m,s)}$ normally decreases but changes to increase after $\lambda$ exceeds the optimal value. In this base technology, $\lambda$ in which $C_f^{(m,s)}$ becomes the minima is defined as $\lambda_{opt}$. As observed in FIG. 16, even if $C_f^{(m,s)}$ begins to decrease again in the range $\lambda > \lambda_{opt}$, the mapping will not be as good. For this reason, it suffices to pay attention to the first occurring minima value. In this base technology, $\lambda_{opt}$ is independently determined for each submapping including $f^{(n)}$.

Figure 17:
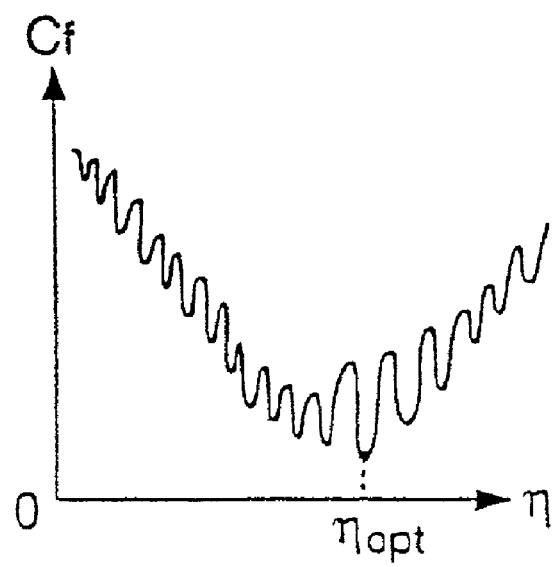
FIG. 17 is a diagram showing the behavior of energy $C_f^{(n)}$ corresponding to $f^{(n)}$ ($\eta=i\Delta\eta$) (i=0, 1, . . . ) which has been obtained while changing η.

FIG. 17 shows the behavior of the energy $C_f^{(n)}$ corresponding to $f^{(n)}(\eta=i\Delta\eta)$ (i=0, 1, . . . ) while varying $\lambda$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the base technology, or more than two parameters. When there are more than three parameters used, they may be determined while changing one at a time.

(2) In the base technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0+\beta E_1$, for example, may be used as the combined evaluation equation, where $\alpha+\beta=1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

Preferred Embodiments Concerning Image Generation

The base technology provides a method of determining a correspondence between points or pixels within two images (or key frames) and of interpolating between the two key frames. In the embodiments, information regarding the correspondence between two key frames I1 and I2 (sometimes called "corresponding point data") is saved in a corresponding point file F, according to the base technology. The corresponding point file F can then be used for generating an intermediate frame or frames between the first key frame I1 and the second key frame I2 using interpolation. As described in the base technology, intermediate frames at any temporal position can be generated by interpolating each of the corresponding points. Thus, storing the first key frame I1, the second key frame I2 and the corresponding point file F allows generation of a morphing and/or smooth motion pictures between the key frames I1 and I2. Since the corresponding point file F is generally smaller than the intermediate frame or frames which would otherwise be needed to make a motion picture, this gives a compression effect for motion pictures. Experiments using the base technology have provided very beautiful motion pictures at relatively high compression rates generally exceeding compression rates for MPEG.

In the base technology, corresponding point data are obtained pixel by pixel, such that the size of the corresponding point file F may need to be relatively large. In order to further reduce the size of the corresponding point file F, some modifications have been proposed. For example, a mesh may be provided on the first key frame I1, and the corresponding point file F will only contain corresponding point data for pixels corresponding to the lattice points of the mesh. In this case, corresponding point data for points other than the lattice points may be generated by interpolation based on the corresponding point data for lattice points surrounding said points. This modification of the base technology by using a mesh is more particularly described in, for example, U.S. patent application Ser. No. 09/991,911, the content of which is hereby incorporated by reference.

Figure 18:
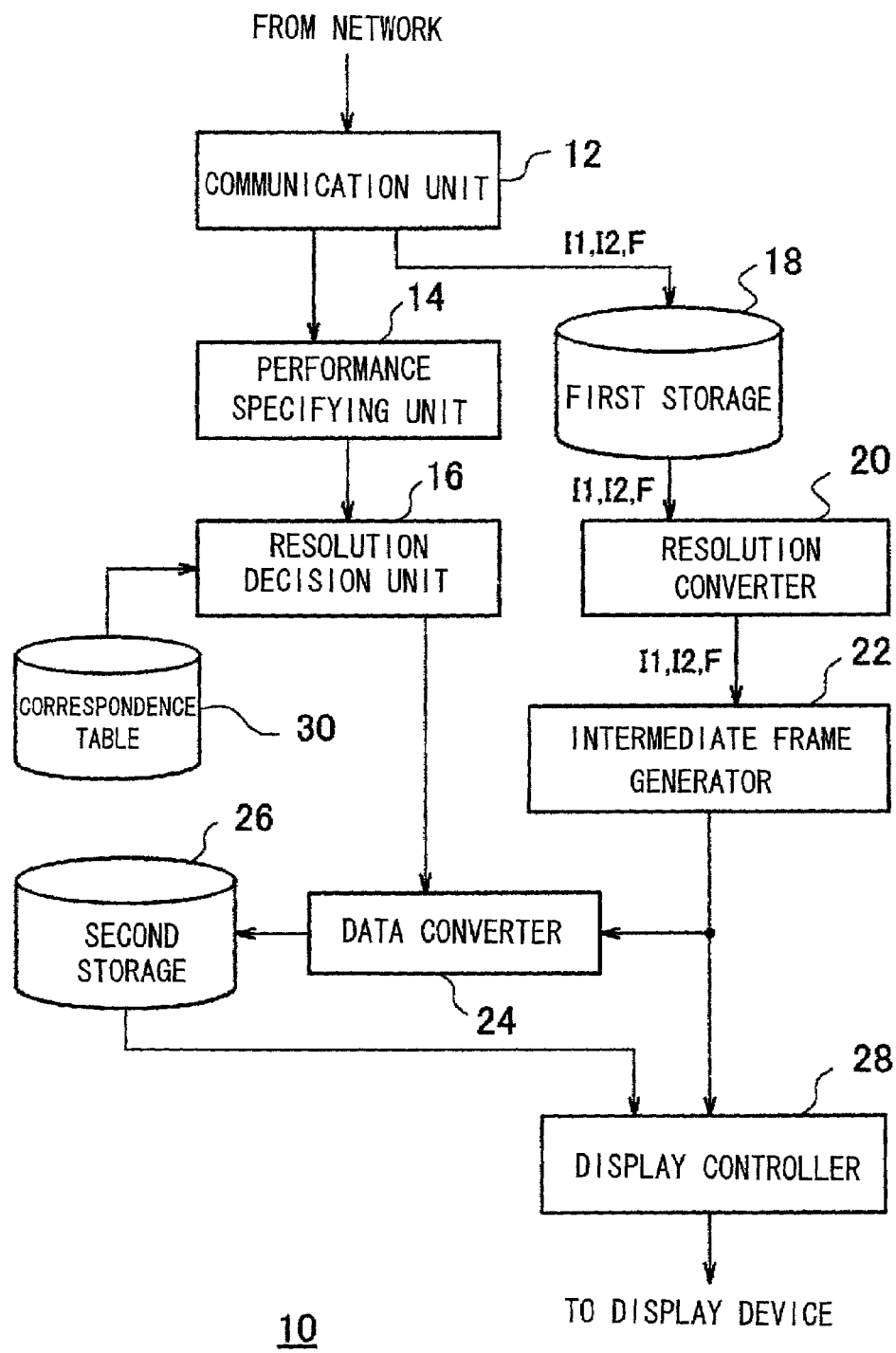
FIG. 18 shows an image generating apparatus according to an embodiment of the invention.

FIG. 18 shows a structure of an image generating apparatus 10 according to an embodiment of the present invention. A communication unit 12 acquires or receives the first key frame I1, the second key frame I2 and the corresponding point file F, for example, via a network or the like. The first key frame I1, second key frame I2 and corresponding point file F are stored in a first storage unit 18 and the communication unit 12 activates a performance specifying unit 14.

The performance specifying unit 14 detects, determines or specifies an image processing capacity for the image generating apparatus 10. For example, the performance specifying unit 14 may detect or determine the following as performance data to be used to specify the performance: whether or not there is an accelerator or a graphic board mounted in the apparatus 10, the type of CPU in the apparatus 10 and/or its operating frequency, or as the case may be, the type of graphic chip equipped in a standardized manner in the apparatus 10. This performance data may be acquired, for example, from the OS (Operating System) of the apparatus 10 and/or can be detected by reading out a system register of the apparatus 10.

Alternatively, the performance specifying unit 14 may measure the image processing capacity of the apparatus by referring to an experimental generation of intermediate frames by an intermediate frame generator 22 (described later) of the apparatus 10. In this case, for example, predetermined image frames having a predetermined, preferably low, resolution and a corresponding point file thereof ("test data") may be included in the performance specifying unit 14 or sent in advance of the key frames I1, I2 and corresponding point file F and then the performance specifying unit 14 transfers the test data to the intermediate frame generator 22 via a path (not shown), in order to perform the experiment. When the intermediate frame is generated by the intermediate generator 22, the time required is acquired by the performance specifying unit 14, so that the performance of the apparatus 10 can be measured.

The performance specifying unit 14 may also detect the performance of the apparatus 10 by other methods. For example, a so-called benchmark test, which is primarily used for measuring the performance of computers, may be carried out.

Still further, the performance specifying unit 14 may receive information on the performance of the apparatus 10 through the communication unit 12 or by referring to previously determined value.

At any rate, the performance specifying unit 14 classifies the processing performance or capacity of the apparatus 10 into ranks A, B, . . . , X (described later) based on the performance.

Next, a resolution decision unit 16 determines a resolution of motion pictures to be reproduced by the apparatus 10, based on the rank assigned by the performance specifying unit 14. For example, the resolution decision unit 16 may refer to a predetermined correspondence table 30 that contains a relation between the performance rank and an appropriate resolution. The resolution thus determined is provided to a resolution converter 20.

The resolution converter 20 reads the first key frame I1 and the second key frame I2 from a first storage unit 18, and then, based on the resolution determined by the resolution decision unit 16, adjusts the resolution of the key frames I1, I2, by, for example, a downscaling, or conversion to a lower resolution. The resolution converter 20 then outputs the key frames I1, I2 to the intermediate image generator 22. In the case where the resolution does not need to be converted, the first key frame I1 and the second key frame I2 are output to the intermediate frame generator 22 without change. It is to be noted that downscaling may be performed by, for example, selecting only the odd numbered pixels in both the horizontal and vertical directions, so that images equivalent to ¼ resolution can be generated. In addition, any other known resolution adjusting methods may be used. However, considering the intention to provide real-time processing, a method capable of providing a relatively high-speed conversion is preferable.

The corresponding point file F is also read from the first storage unit 18 by the resolution converter 20. In the case where the resolution was adjusted for the first key frame I1 and the second key frame I2 in the resolution converter 20, a similar modification is performed on the corresponding point file F. For example, when a ½ downscaling is performed in the horizontal and vertical directions, the number of pixels described in the corresponding point file is preferably converted to ½ accordingly. The corresponding point file F, adjusted as necessary, is also output to the intermediate frame generator 22.

Utilizing the input first key frame I1, second key frame I2 and corresponding point file F, the intermediate frame generator 22 generates an intermediate frame or frames (any number of frames) by an interpolation computation according to, for example, the method described in the base technology. In particular, the number of intermediate frames may be set to provide 24 or 30 frames per second in the case of motion pictures. The thus generated intermediate frames together with the two key frames I1, I2 are output to a display controller 28. The display controller 28 rearranges the received frames in an appropriate display order, and outputs them to a display device. Thereby, generation or reproduction of a motion picture is realized. Where necessary, the display conroller 28 may also provide a conversion to a data format required by the display device.

The above-described processes apply generally to the case where the intermediate frames can be generated and displayed in real-time by appropriately adjusting (downscaling) the resolution. On the other hand, there may also be a case where it is determined that an appropriate level of resolution (i.e. appropriately viewable by a user) cannot be given by real-time processing because the processing performance of the apparatus 10 is very low. In this case, the resolution decision unit 16 notifies a data converter 24 to this effect. The data converter 24 then buffers the key frames and the intermediate frames output from the intermediate frame generator 22 and converts them to a movie file so as to be stored in a second storage unit 26. The movie file may be any applicable file format, such as MPEG format, AVI (Audio Video Interleave) format and so forth. As such, in this method, the real-time frame generation by the intermediate frame generator 22 is not an issue, so that frames generated at a slower speed may be output, at least temporarily, to a movie file, which may be read out of the second storage unit 26 and then displayed. In this case, although generation of the movie file takes a predetermined duration of time, the once generated movie file enables uninterrupted generation or reproduction from then on. The data converter 24 may be so structured that, when generating the movie file, it notifies a user accordingly, by, for example, presenting a conversion progress bar or the like on a display.

FIG. 19 shows an example of the correspondence table 30. In this example, the correspondence table 30 includes a column 100 which indicates whether or not a graphics accelerator is available for use, a column 102 which shows a type of CPU, a column 104 which shows an operating frequency (clock) of the CPU, a column 106 which shows a maximum limit of the resolution up to which the real-time reproduction is possible, and a column 108 which shows the rank of a performance classified by the performance specifying unit 14. In the column 100 showing whether or not the graphic accelerator is available, "1" indicates that the accelerator is available while "0" indicates that the accelerator is not available.

Referring still to FIG. 19, when there is a graphic accelerator, the apparatus is classified as rank A, which corresponds to the maximum performance, irrespective of the type of CPU and the operating frequency. In a similar manner, even if there is no graphic accelerator, in the cases where the CPU is of type "○○○" and its operating frequency CL is greater than or equal to 750 MHz, and the CPU is of type "ΔΔΔ" and its operating frequency CL is greater than or equal to 600 MHz, both the apparatuses are classified as the rank A. These entries correspond to the fact that when there is a graphic accelerator, the accelerator takes charge of image processing in place of the CPU, so that the maximum performance can be expected irrespective of the type of CPU and the operating frequency, and the fact that even when there is no graphics accelerator, the maximum performance depends more on the type of CPU and the operating frequency.

On the other hand, when there is no graphic accelerator and the CPU is "○○○" and its operating frequency is 400–750 MHz, the apparatus may be classified as rank B. Similarly, when the CPU is "ΔΔΔ" and its operating frequency is 250–600 MHz, the apparatus may also be classified as rank B. In rank A, the maximum value of allowable resolution is 1200×1200, wheras in rank B, the maximum resolution allowable may be 600×600.

Moving down the table, when there is no graphic accelerator and, in addition, the clock frequency of the CPU is low, for example, when the CPU is "○○○" and its operating frequency CL is less than or equal to 80 MHz or when the CPU is "ΔΔΔ" and its operating frequency CL is less than or equal to 60 MHz, the apparatus will be classified as rank X. This rank X represents a determination that real-time reproduction at an appropriate resolution is impossible. Thus, when classified as rank X, a conversion to a movie file by the data converter 24 may be carried out. In a similar manner, when the CPU is ranked as "others" indicating a case in which the performance specifying unit 14 fails to determine a processing performance, for example, by failing to identify the CPU, the apparatus is also classified as rank X no matter what the operating frequency may be so that the movie file will be generated rather than using real-time processing.

As indicated above, the correspondence table 30 shown is given as an example only, the values, including the ranks, may be adjusted according to particular circumstances.

Figure 20:
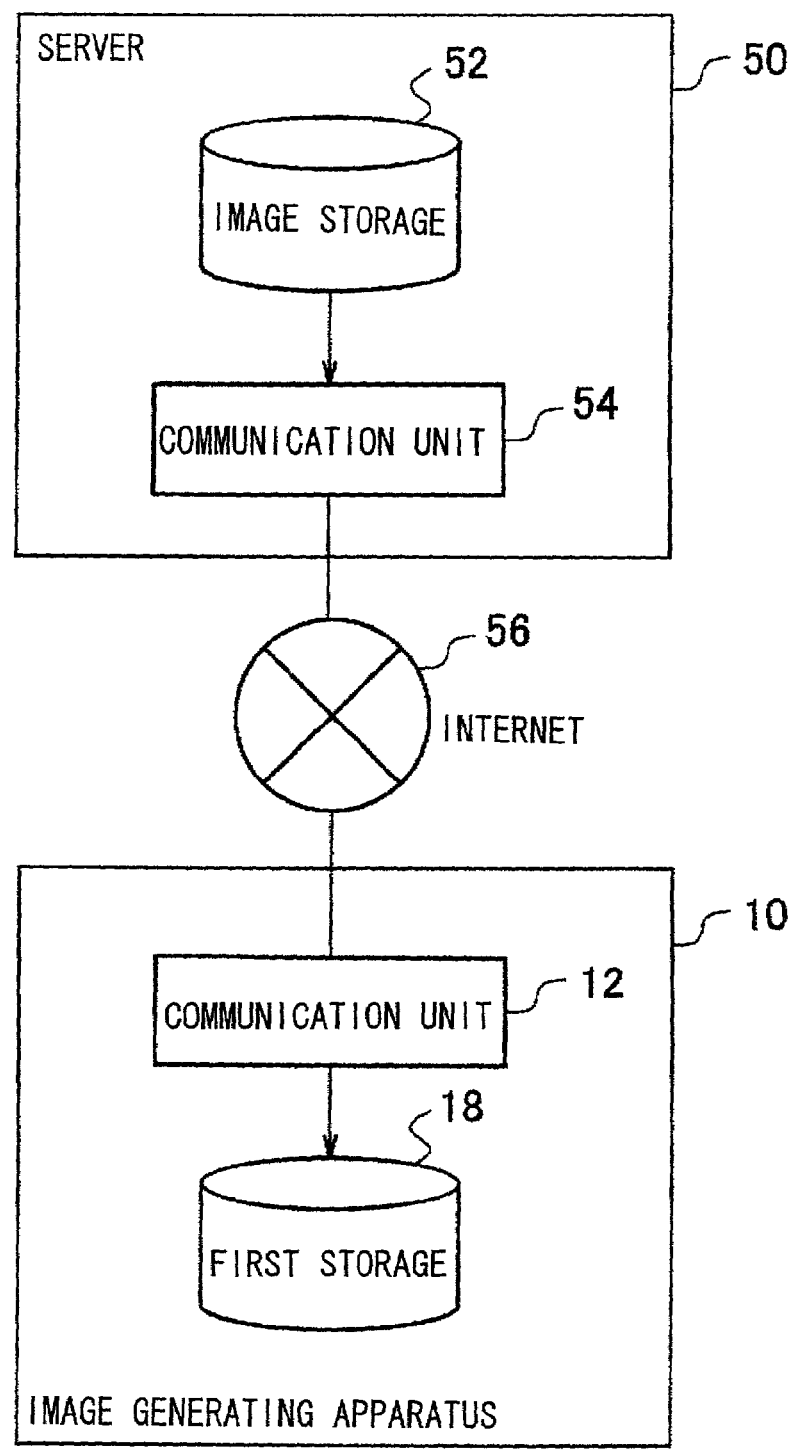
FIG. 20 shows an image generating system according to an embodiment of the invention.

FIG. 20 shows an image generating system 200 according to an embodiment of the present invention. This image generating system 200 is a client-server system which includes a server 50 that includes an image storage unit 52, which stores data regarding key frames and corresponding point files, and a communication unit 54. The image generating system 200 also includes an image generating apparatus 10 (serving as a client) that includes a communication unit 12 and a first storage unit 18. In this embodiment, the image generating apparatus 10 is structured as described with regard to and as shown in FIG. 18, however, some elements have been left out of FIG. 20 to simplify the figure. Both the communication units 54 and 12 communicate via a network such as the Internet 56.

Next, the operation of the image generating system 200 will be described. First, a user sends a request for distribution of motion pictures or the like from the image generating apparatus 10 to the server 50. The server 50 retrieves the necessary key frames and corresponding point file or files from the image storage unit 52, and then sends them to the image generating apparatus 10 via the Internet 56. The image generating apparatus 10 acquires these data (the key frames and corresponding point file or files). The image generating apparatus 10 then operates as described above in reference to FIG. 18, including performing any necessary conversion of the resolution and then displays the images on a display device. In a case where it is determined that real-time processing is not possible even after the resolution is downscaled, the real-time reproduction of the motion pictures is abandoned and the intermediate frames generated may be converted to a movie file together with the key frames. The movie file, obtained after the conversion, may then be reproduced as a normal movie, at any time desired by the user.

By implementing the present embodiments, the server 50 can send the same key frames and corresponding point file or files, regardless of the processing performance of the client (i.e. image generating apparatus 10 or user terminal). Also, since the image generating apparatus 10 determines its own image processing capacity, the received motion pictures can be displayed at the maximum resolution for a particular image generating apparatus 10, for example, the maximum image quality in the range limit where the real-time reproduction is possible. Thus, the server 50 has a lower load since it does not need to determine a resolution and customize content for each client. The data sent by the server 50 may be the same key frames and corresponding point file or files.

It is also evident from the base technology that the use of corresponding point files for the reproduction of motion pictures provides a high level of motion-picture compression. Now, by implementing the present embodiments, high quality, highly compressed data can be sent to provide a maximum image quality in response to different performance per client without unduly requiring a high bandwidth.

The present invention has been described based on several embodiments. As will be understood, each of the components, elements, functions or processes may also be provided in the form of computer programs, where appropriate. Moreover, combinations and rearrangements of the above-described components, elements, functions or processes are also effective as embodiments of the present invention. Some examples of modifications arising from the embodiments will be described hereinafter.

In the embodiment, the performance specifying unit 14 detects performance of the apparatus by acquiring data from an OS or other similar means. However, the performance may also be specified by the user. For example, even though the real-time reproduction is possible, the user may desire that the received data be saved for later reproduction or converted to a movie file and then reproduced thereafter. In this case, the performance specifying unit 14 may display choices so that the user can select among modes such as "real time and high image quality", "real time and small image", "view later", "record to movie file" and so forth via a GUI (Graphical User Interface).

In the embodiments, the key frames and the corresponding point file are acquired from the network however, the image generating apparatus 10 itself may provide the image matching function described in the base technology. In this case, the image generating apparatus 10 is preferably equipped with a matching unit (not shown) in which critical points are detected respectively for the two key frames, and in which the matching is detected based on these critical points. In a particular case, the matching unit may first convert the key frames to hierarchized images and the matching may be carried out in order starting from the coarsest image, as described in the base technology.

In the present embodiments, it is determined whether or not there is a graphic accelerator in the image generating apparatus 10, the type of CPU or the like. However, in a particular case, an image processing accelerator may be provided exterior to the image generating apparatus 10. In this case, the performance specifying unit 14 may also determined whether or not there is such an externally provided accelerator and then classify the performance based on the detected result.

In the image generating system 200 (client-server system), although it is preferrable for the performance specifying unit 14 and resolution decision unit 16 to be provided at the image generating apparatus 10, either of these units or there functions may be included in the server 50 or be implemented by co-operation or communication between the image generating apparatus 10 and the server 50 or the like.

Although the present invention has been described by way of exemplary embodiments, it should be understood that many changes and substitutions may be made by those skilled in the art without departing from the spirit and the scope of the present invention which is defined by the appended claims.

What is claimed is:

1. An image generating method in which intermediate frames are generated based on key frames and corresponding point data between the key frames, the method comprising:
   detecting a processing performance of an apparatus which generates the intermediate frames;
   determining resolution of the intermediate frames to be generated in accordance with the detected processing performance; and
   performing conversion processing on the key frames and the corresponding point data in accordance with the determined resolution of the intermediate frames to be generated,
   wherein the detecting of the processing performance, the determining of the resolution of the intermediate frames to be generated and the performing of the conversion processing are all carried out in the apparatus which generates the intermediate frames.

2. A method according to claim 1, further comprising generating intermediate frames by performing an interpolation computation on the key frames at the determined resolution, wherein the intermediate frames are generated based on the key frames and the corresoonding point data after the conversion processing.

3. A method according to claim 1, wherein the detecting the processing performance comprises determining if there is an optional graphics accelerator available for use by the apparatus.

4. A method according to claim 1, wherein the detecting the processing performance comprises determining a processing speed of a CPU of the apparatus.

5. A method according to claim 1, wherein said detecting the processing performance is carried out by the apparatus.

6. A method according to claim 1, wherein said detecting the processing performance comprises experimentally generating intermediate frames in the apparatus and determining the processing performance based thereon.

7. An image generating apparatus which generates intermediate frames based on key frames and corresponding point data between the key frames, the apparatus comprising:
   a performance detecting unit which detects a processing performance of the apparatus;
   a resolution decision unit which determines resolution of the intermediate frames to be generated according to the processing performance detected by said performance detecting unit; and
   a resolution converter which performs conversion processing on the key frames and the corresponding point data in accordance with the determined resolution of the intermediate frames to be generated; and
   an intermediate frame generator which generates the intermediate frames utilizing the key frames and the corresponding point data after the conversion processing.

8. An apparatus according to claim 7, wherein said performance detecting unit detects the processing performance by determining whether or not there is an optional accelerator available for use by the apparatus.

9. An apparatus according to claim 7, wherein said performance detecting unit detects the processing performance by determining a processing speed of a CPU of the apparatus.

10. An apparatus according to claim 7, wherein said performance detecting unit experimentally generates intermediate frames in the apparatus and detects the processing performance of the apparatus based thereon.

11. A computer program executable by a computer, the program comprising the functions of:
    determining a processing performance of an apparatus which generates intermediate frames based on key frames and corresponding point data therefor;
    determining a resolution of the intermediate frames to be generated according to the determined processing performance; and
    performing conversion processing on the key frames and the corresponding point data in accordance with the determined resolution of the intermediate frames to be generated,
    wherein the detecting of the processing performance, the determining of the resolution of the intermediate frames to be generated and the performing of the conversion processing are all carried out in the apparatus which generates the intermediate frames.

12. A computer program according to claim 11, further comprising generating the intermediate frames according to the determined resolution, wherein the intermediate frames are generated based on the key frames and the corresponding point data after the conversion processing.

* * * * *